US009639920B2

(12) United States Patent
Dai et al.

(10) Patent No.: US 9,639,920 B2
(45) Date of Patent: May 2, 2017

(54) DITHER DIRECTED LUT OUTPUT VALUE INTERPOLATION

(71) Applicant: QUALCOMM Incorporated, San Diego, CA (US)

(72) Inventors: Min Dai, San Diego, CA (US); Ike Ikizyan, San Diego, CA (US); Ai-Mei Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/939,749

(22) Filed: Nov. 12, 2015

(65) Prior Publication Data
US 2017/0076431 A1 Mar. 16, 2017

Related U.S. Application Data

(60) Provisional application No. 62/218,333, filed on Sep. 14, 2015.

(51) Int. Cl.
G06K 9/00 (2006.01)
G06T 5/00 (2006.01)
(Continued)

(52) U.S. Cl.
CPC ............ *G06T 5/002* (2013.01); *G06T 3/4007* (2013.01); *H04N 1/60* (2013.01); *G06T 2207/10024* (2013.01)

(58) Field of Classification Search
CPC H04N 1/46; H04N 1/52; H04N 1/506; H04N 1/60; H04N 1/6019; H04N 1/6025;
(Continued)

(56) References Cited

U.S. PATENT DOCUMENTS 5,377,041 A 12/1994 Spaulding et al.
5,905,490 A 5/1999 Shu et al.
(Continued)

FOREIGN PATENT DOCUMENTS

EP 2169657 A1 3/2010
JP 4035176 B2 1/2008

OTHER PUBLICATIONS

Pixar, "The RenderMan Interface" Version 3.2.1, Nov. 2005, 226 pp.
(Continued)

*Primary Examiner* — Jose Couso
(74) *Attorney, Agent, or Firm* — Shumaker & Sieffert, P.A.

(57) ABSTRACT

In an example, a method for image processing may include inputting a first pixel value corresponding to a first pixel of an image into a LUT. The LUT may map one or more LUT input values to one or more LUT output values. The first pixel value may correspond to a first LUT input value that maps to a first LUT output value in the LUT. The first pixel may include one or more pixel values. The method may include generating a noise value for the first LUT input value. The method may include generating a first interpolated LUT output value for the first LUT input value based on the noise value. The method may include transforming the image into a transformed image using the first interpolated LUT output value.

30 Claims, 14 Drawing Sheets

(51) Int. Cl.
*H04N 1/60* (2006.01)
*G06T 3/40* (2006.01)

(58) Field of Classification Search
CPC .......... H04N 1/407; H04N 1/409; H04N 1/58;
H04N 5/202; H04N 5/357–5/3658; H04N
7/0135–7/0147; H04N 7/102; H04N
9/3182; H04N 9/7908; H04N 19/117;
H04N 19/124; H04N 19/126; H04N
19/132; H04N 19/30; H04N
19/577–19/59; H04N 19/69; H04N 19/80;
H04N 19/86; H04N 19/94; G06T 3/4007;
G06T 5/20; G06T 5/002; G06T 5/004;
G06T 5/008; G06T 5/009; G06T
2207/10024; G06K 7/10881; G06K 9/40;
G06K 15/1876; G06K 15/1881; G09G
3/2003; G09G 3/2048; G09G 5/02; G09G
2300/0452; G09G 2320/0247; G09G
2320/0266; G09G 2340/0428; G09G
2340/06
See application file for complete search history.

(56) References Cited

U.S. PATENT DOCUMENTS

| | | |
|---|---|---|
| 6,809,740 B1 | 10/2004 | Weed |
| 7,710,470 B2* | 5/2010 | Kohashi .................. H04N 1/38 |
| | | 348/234 |
| 8,711,249 B2* | 4/2014 | Baqai ....................... H04N 1/00 |
| | | 348/241 |
| 2004/0017852 A1 | 1/2004 | Garrido et al. |
| 2005/0276502 A1 | 12/2005 | Brown Elliott et al. |
| 2013/0121408 A1 | 5/2013 | Chono et al. |

OTHER PUBLICATIONS

Segal, Mark et al., "The OpenGL Graphics System: A Specification", Version 4.5 (Core Profile), May 28, 2015, 831 pp.

Khronos Group Inc., "Open GL ES" Version 3.2, Aug. 10, 2015, 642 pp.

Gee, Kevin, "Introduction to the Direct3D 11 Graphics Pipeline", XNA Developer Connection, Microsoft Corporation, Nvision 08, Aug. 25-27, 2008, 55 pp.

Daly et al. "X3D: Extensible 3d Graphics Standard" IEE Signal Processing Magazine. Issue 130, Nov. 2007, 6 pp.

Sanders et al, "CUDA by Example: an Introduction to General-Purpose GPU Programming", Addison-Wesley Professional, Jul. 2010, 43 pp.

Response to Written Opinion dated Nov. 16, 2016, from International Application No. PCT/US2016/045345, filed Feb. 1, 2017, 5 pp.

International Search Report and Written Opinion of International Application No. PCT/US2016/045345, mailed Nov. 16, 2016, 11 pp.

* cited by examiner

| LUT Input Value | LUT Output Value |
|---|---|
| 0 | 0 |
| 1 | 0 |
| 2 | 4 |
| 3 | 16 |
| 4 | 24 |
| 5 | 28 |
| 6 | 28 |
| 7 | 28 |

>> d4 - round(mean(d4(:)))
ans =
    7   -1    5   -3
   -5    3   -7    1
    4   -4    6   -2
   -8    0   -6    2
```

FIG. 9

DITHER DIRECTED LUT OUTPUT VALUE INTERPOLATION

This application claims the benefit of U.S. Provisional Patent Application No. 62/218,333 filed on Sep. 14, 2015, which is hereby incorporated by reference herein in its entirety.

TECHNICAL FIELD

This disclosure relates to image and/or video processing.

BACKGROUND

Image and/or video processing may introduce processing artifacts in the output image and/or video. However, processing artifacts may be undesirable because they present an unnatural or distorted appearance to the processed image and/or video.

SUMMARY

In general, this disclosure describes techniques for image and/or video processing, and more specifically to techniques for reducing, removing, and/or preventing one or more contour artifacts (sometimes referred to as false contouring, banding, or posterization artifacts).

In one example, this disclosure describes a method comprising inputting, by a processing unit, a first pixel value corresponding to a first pixel of an image into a Look Up Table (LUT), wherein the LUT maps one or more LUT input values to one or more LUT output values, and wherein the first pixel value corresponds to a first LUT input value that maps to a first LUT output value in the LUT; generating, by the processing unit, a noise value for the first LUT input value; generating, by the processing unit, a first interpolated LUT output value for the first LUT input value based on the noise value; and transforming, by the processing unit, the image into a transformed image using the first interpolated LUT output value.

In another example, this disclosure describes a device comprising a memory for storing an image; and one or more processors configured to: input a first pixel value corresponding to a first pixel of the image into a Look Up Table (LUT), wherein the LUT maps one or more LUT input values to one or more LUT output values, and wherein the first pixel value corresponds to a first LUT input value that maps to a first LUT output value in the LUT; generate a noise value for the first LUT input value; generate a first interpolated LUT output value for the first LUT input value based on the noise value; and transform the image into a transformed image using the first interpolated LUT output value.

In another example, this disclosure describes an apparatus comprising means for inputting a first pixel value corresponding to a first pixel of an image into a Look Up Table (LUT), wherein the LUT maps one or more LUT input values to one or more LUT output values, and wherein the first pixel value corresponds to a first LUT input value that maps to a first LUT output value in the LUT; means for generating a noise value for the first LUT input value; means for generating a first interpolated LUT output value for the first LUT input value based on the noise value; and means for transforming the image into a transformed image using the first interpolated LUT output value.

In another example, this disclosure describes a non-transitory computer-readable storage medium having instructions stored thereon that, when executed, cause one or more processors of a computing device to: input a first pixel value corresponding to a first pixel of an image into a Look Up Table (LUT), wherein the LUT maps one or more LUT input values to one or more LUT output values, and wherein the first pixel value corresponds to a first LUT input value that maps to a first LUT output value in the LUT; generate a noise value for the first LUT input value; generate a first interpolated LUT output value for the first LUT input value based on the noise value; and transform the image into a transformed image using the first interpolated LUT output value.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 3 shows one example of the LUT depicted in FIG. 2 in table form.

FIG. 9 shows an exemplary computation of a NOISE_TABLE described herein.

DETAILED DESCRIPTION

Figure 1:
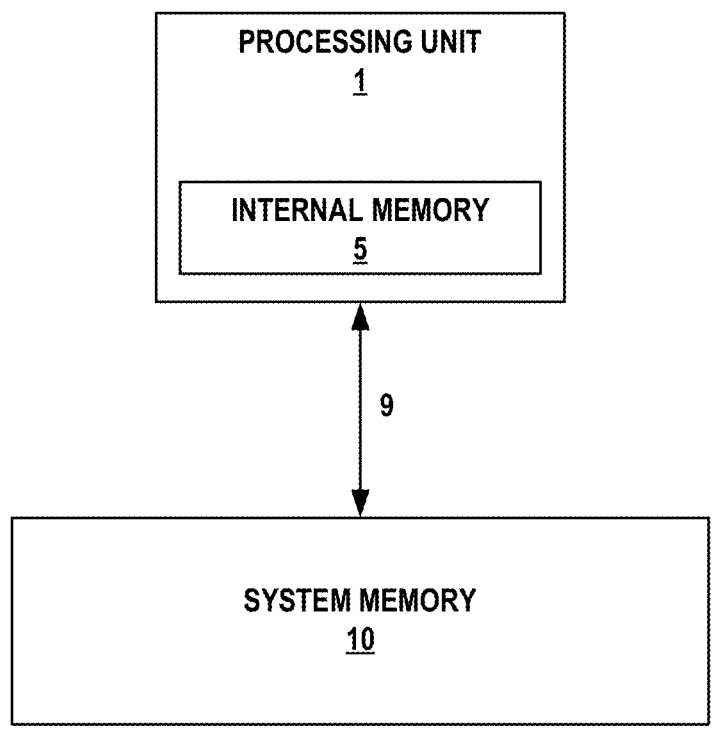
FIG. 1 is a block diagram showing an example processing unit configured to use the techniques of this disclosure.

In general, the techniques of this disclosure are directed to techniques for image and/or video processing, and more specifically to techniques for reducing, removing, and/or preventing one or more contour artifacts in an image (sometimes referred to as false contouring, banding, or posterization artifacts).

As used herein, the term "image processing" means "image and/or video processing." Image processing may be understood as transforming an image into a transformed image using one or more image processing techniques. Some examples of image processing include forward gamma correction (GC), inverse gamma correction, gamma correction, contrast enhancement, contrast correction, color correction, color transform, tone mapping, inverse tone mapping, any image processing technique, or any combinations thereof.

The techniques described herein, when applied to video frames or still images, may reduce, remove, and/or prevent one or more contour artifacts when processing one or more images and/or video frames. The techniques described herein, when applied to an image and/or video frame, may reduce, remove, and/or prevent one or more contour artifacts when processing the image. A single image or one or more images of a video may be processed in one or more sub-parts, such as one or more tiles of an image. The image processing described herein may be performed using any color format. Accordingly, while RGB or any other color format may be specifically identified, this disclosure is not limited to only the specifically referenced color formats.

As used herein, the term "image" may refer to a single image, one or more images, one or more images amongst a plurality of images corresponding to a video, one or more images amongst a plurality of images not corresponding to a video, a plurality of images corresponding to a video (e.g., all of the images corresponding to the video or less than all of the images corresponding to the video), a sub-part of a single image, a plurality of sub-parts of a single image, a plurality of sub-parts corresponding to a plurality of images, one or more graphics primitives, image data, graphical data, and the like. In this regard, as described herein, applying the techniques described herein to an image may refer to applying the techniques described herein to a single image, one or more images, one or more images amongst a plurality of images corresponding to a video, one or more images amongst a plurality of images not corresponding to a video, a plurality of images corresponding to a video (e.g., all of the images corresponding to the video or less than all of the images corresponding to the video), a sub-part of a single image, a plurality of sub-parts of a single image, a plurality of sub-parts corresponding to a plurality of images, one or more graphics primitives, data, graphical data, and the like. A sub-part of an image may refer to one or more tiles or other smaller part or combination of parts lesser than the whole image. As used herein, a video may be a plurality of images that may be presented in a sequence.

As used herein, the term "image processing" may refer more broadly to "pixel processing" meaning that the techniques described herein with respect to image processing may equally apply to pixel processing. For example, while "image processing" and "pixel processing" may be used interchangeably depending on the context, the techniques described herein may be used for processing pixels in examples where such terms may not be used interchangeably. For example, the techniques described herein may apply to the processing of one or more pixels even when the one or more pixels are disassociated from an image.

FIG. 1 is a block diagram illustrating an example processing unit that may be configured to implement one or more aspects of this disclosure. As shown in FIG. 1, processing unit 1 may include internal memory 5. Memory external to processing unit 1, such as depicted system memory 10, may be accessible to processing unit 1. For example, processing unit 1 may be communicatively coupled to system memory 10 over a bus. In some examples, processing unit 1 may be directly communicatively coupled to system memory 10 via a communication medium such as bus 9. In other examples, processing unit 1 may be indirectly communicatively coupled to system memory 10 via a communication medium such as a bus. For example, processing unit 1 may be communicatively directly coupled to another component (e.g., a different processing unit) which is directly communicatively coupled to system memory 10 via a communication medium such as a bus.

Internal memory 5 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media.

System memory 10 may be a non-transitory storage medium according to some examples. The term "non-transitory" may indicate that the storage medium is not embodied in a carrier wave or a propagated signal. However, the term "non-transitory" should not be interpreted to mean that system memory 10 is non-movable or that its contents are static. As one example, system memory 10 may be removed from computing device 2, and moved to another device. As another example, memory, substantially similar to system memory 10, may be inserted into computing device 2. In certain examples, a non-transitory storage medium may store data that can, over time, change (e.g., in RAM).

Processing unit 1 may be a central processing unit (CPU), a graphics processing unit (GPU), a display processing unit, a digital signal processing unit (DSP), or any other processing unit. Processing unit 1 be integrated into a motherboard of a computing device. In some examples, processing unit 1 may be may be present on a graphics card that is installed in a port in a motherboard of a computing device, or may be otherwise incorporated within a peripheral device configured to interoperate with a computing device. In some examples, processing unit 1 may be on-chip with a CPU, such as in a system on chip (SOC). Processing unit 1 may include one or more processors, such as one or more microprocessors, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. Processing unit 1 may also include one or more processor cores, so that processing unit 1 may be referred to as a multi-core processor. In some examples, processing unit 1 may be specialized hardware that includes integrated and/or discrete logic circuitry that provides processing unit 1 with massive parallel processing capabilities suitable for graphics processing.

Figure 5:
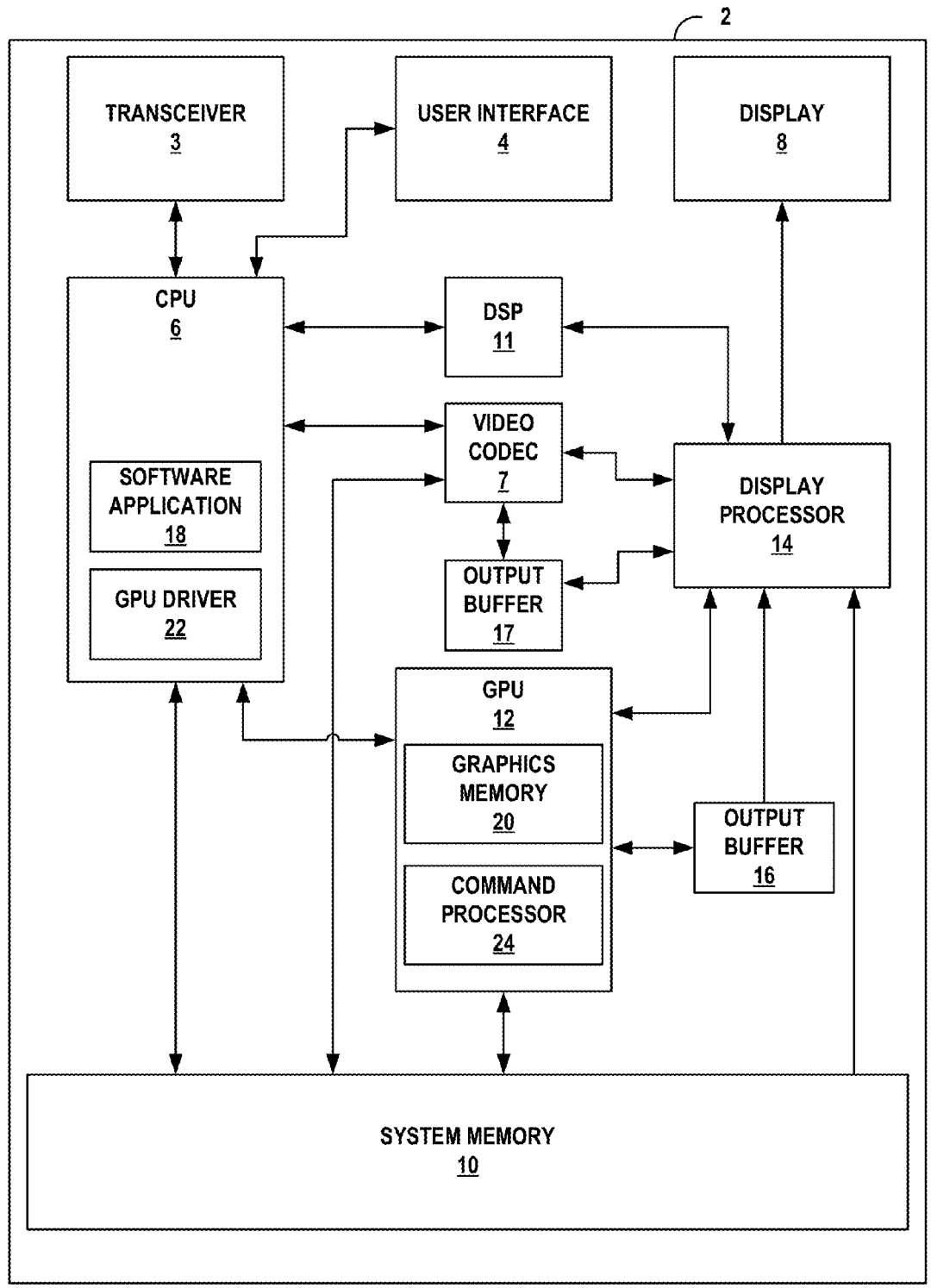
FIG. 5 is a block diagram showing an example computing device configured to use the techniques of this disclosure.

For example, while FIG. 5 is discussed in more detail below, processing unit 1 may be CPU 6, GPU 12, digital signal processor (DSP) 11, display processor 14, video codec 7 or another component (whether depicted or not) of computing device 2 depicted in FIG. 5. As another example, processing unit 1 may be any processing unit that is configured to perform image processing or any pixel processing. As another example, processing unit 1 may be any processing unit configured to use a Look Up Table (LUT) to perform image processing or any pixel processing.

In some examples, processing unit 1 may be configured to receive, transmit, and/or generate data (e.g., an image as defined herein) on which one or more image processing techniques described herein may be performed. For example, processing unit 1 may be configured to receive data on which one or more image processing techniques described herein may be performed from another processing unit (e.g., another processing unit 1) or any other source (e.g., any other processing unit or a storage medium such as system memory 10, internal memory 5, or any other memory space). As another example, processing unit 1 may be a GPU (e.g., GPU 12) that is configured to receive, transmit, and/or generate data on which one or more image processing techniques described herein may be performed. Such data may include graphical data received from, for example, a CPU (e.g., CPU 6) or any other source, and/or graphical data transmitted to, for example, a display processor (e.g., display processor 14). In other examples, processing unit 1 may be a display processing unit (e.g., display processor 14) that is configured to receive, transmit, and/or generate data on which one or more image processing techniques described herein may be performed. Such data may include graphical data received from, for example, a CPU (e.g., CPU 6), a GPU (e.g., GPU 12), or any other source. In other examples, processing unit 1 may be a CPU (e.g., CPU 6) that is configured to receive, transmit, and/or generate data on which one or more image processing techniques described herein may be performed. Such data may include graphical data received from, for example, another CPU, a GPU (e.g., GPU 12), or any other source. In other examples, processing unit 1 may be a digital signal processor (e.g., DSP 11) that is configured to receive, transmit, and/or generate data on which one which or more image processing techniques described herein may be performed.

One or more techniques described herein may be implemented in hardware, software, firmware, or any combination thereof. For example, where one or more techniques described herein are implemented in hardware, processing unit 1 may be such hardware or one piece of a plurality of hardware components configured to operate together to perform one or more techniques described herein. In such examples, the hardware may or may not be configured to execute software or firmware that may perform one or more techniques described herein when executed. Any software and/or firmware may be stored on a non-transitory storage medium, such on-chip memory of hardware (e.g., internal memory 5 of processing unit 1) or on external memory to any hardware (e.g., system memory 10).

Processing unit 1 may be configured to use one or more look up tables (LUTs) to perform image processing. For example, one or more LUTs may transform an image into a transformed image via the input-to-output mapping of the LUT. The input-to-output mapping of the LUT may be referred to as a LUT mapping or a LUT mapping configuration. The LUT mapping may map an n-bit input value (e.g., input pixel value) to an n-bit or an m-bit output value (e.g., output pixel value), where n and m may be any integer and n is different than m. For example, a LUT may map an 8-bit input pixel value to a 16-bit output pixel value. In such an example, the LUT may include 256 LUT input values (e.g., 0-255) corresponding to each possible input pixel value, and the LUT may map each LUT input value to one or more 16-bit LUT output values (e.g., one or more pixel values ranging from 0-65,535).

The LUT mapping may correspond to or effectuate forward gamma correction (GC), inverse gamma correction, gamma correction, contrast enhancement, contrast correction, color correction, color transform, tone mapping, inverse tone mapping, any image processing technique, or any combinations thereof. Processing unit 1 may be configured to perform image processing such as forward gamma correction (GC), inverse gamma correction, gamma correction, contrast enhancement, contrast correction, color correction, color transform, tone mapping, inverse tone mapping, any image processing technique, or any combinations thereof. The term "image processing" may thus be understood as transforming an image to a transformed image.

The techniques described herein may include a LUT-based mapping architecture that retains full flexibility and ease of use of a traditional LUT while reducing or preventing the introduction of contour artifacts during image processing, or while removing contour artifacts during image processing. For example, processing unit 1 may be configured to linearly or non-linearly interpolate between adjacent LUT input values (or non-adjacent LUT input values in some examples). As one example, by linearly interpolating between adjacent table entries, processing unit 1 may be configured to generate one or more values (e.g., all values) between the adjacent entries at the output. In this manner, for example, processing unit 1 may be configured to output unmapped LUT output values despite not being mapped to a particular LUT input value in the LUT. By so doing, processing unit 1 may be configured to remove gaps in the mapping of the LUT output values. Processing unit 1 may be configured to implement one or more techniques described herein without increasing the size of any LUT to which one or more techniques described herein may be applied, meaning that processing unit 1 may be configured to utilize less memory space to store a LUT compared to techniques involving expanding the size of a LUT. Also, from a user's perspective, processing unit 1 may be simple to program because the programming model for processing unit 1 remains the same as it does for a basic LUT.

When processing based on a LUT, the input to the LUT is an input pixel value and the output from the LUT is an output pixel value. In some examples, the term "input pixel value" and equivalents thereof may be synonymous or interchangeable with the term "LUT input value" and equivalents thereof. A LUT may map one or more input pixel values to one or more output pixel values. A pixel may be defined by one or more pixel values. For example, a pixel may include one or more color components where each color component may have a corresponding pixel value. As an example, an RGB color formatted pixel includes three pixel values: a Red pixel value, a Green pixel value, and a Blue pixel value. A pixel value may be defined by one or more bits. For example, an input pixel value may be one or more bits and an output pixel value may be one or more bits. LUT-based image processing may introduce image processing artifacts, such as contour artifacts. Contour artifacts may result from, for example, adjacent table entries in a LUT having gaps in value, which may occur in non-linear mappings. As one example, one LUT mapping configuration may map as follows: 0 to 0, 1 to 1, 2 to 3, 3 to 4, and 4 to 5. According to this example, the input sequence [0, 1, 2, 3, 4] gets mapped to [0, 1, 3, 4, 5]. The jump from 1 to 3 in the output is an example of a gap. This gap may be referred to as a step discontinuity since the output jumps from 1 to 3 with a gap of 2. In this example, the value 2 will never appear in the output. Such a gap may result in visible banding particularly on, for example, a gradient ramp image. Gaps resulting in contour artifacts may result from any LUT employing a non-linear mapping, and in some examples, even a LUT employing a linear mapping.

The image processing techniques described herein include a dithering (or randomization) technique that may reduce or prevent the introduction of contour artifacts (e.g., banding or posterization) to an input image. The image processing techniques described herein include a dithering technique that may reduce or remove existing contour artifacts (e.g., banding or posterization) from an input image. For example, processing unit 1 may be configured to use a dithering technique that may reduce or prevent the introduction of contour artifacts (e.g., banding or posterization) to an input image. As another example, processing unit 1 may be configured to use a dithering technique that may reduce or remove existing contour artifacts (e.g., banding or posterization) from an input image.

Figure 2:
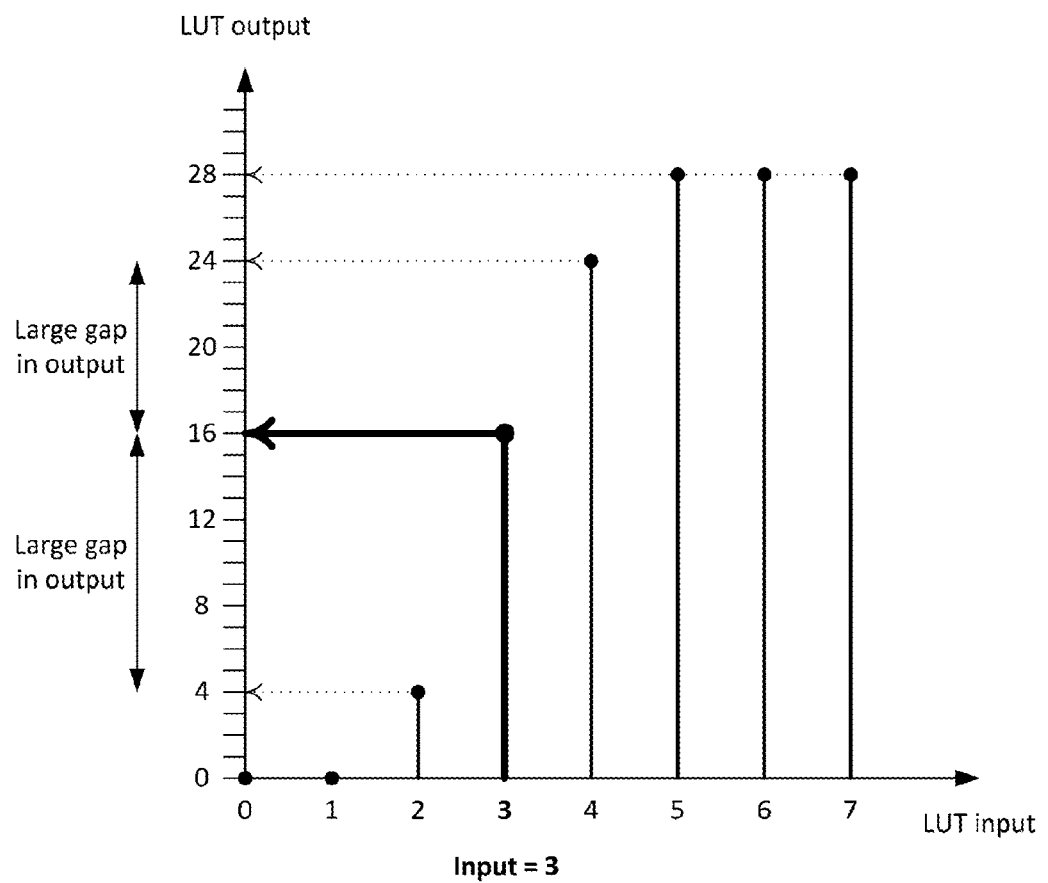
FIG. 2 shows one example of a LUT mapping with output gaps.

FIG. 2 shows one example of a LUT mapping with output gaps. The LUT mapping shown in FIG. 2 is one example of a non-linear mapping. While the LUT mapping in FIG. 2 is graphically represented, it is understood that a LUT mapping may be shown using a simple table, a combination of arrays, or any other representation that conveys a mapping of one or more input values to one or more output values. Processing unit 1 may be configured to derive a graphical representation (such as the graphical representation shown in FIG. 2) for any LUT if the LUT is not in graphical form. For example, FIG. 3 shows one example of the LUT depicted in FIG. 2 in table form. In some examples, the graphical representations of LUTs throughout this disclosure are conceptual in nature and processing unit 1 may be configured to perform one or more techniques described herein off of a table, a combination of arrays, or any other representation that conveys a mapping of one or more input values to one or more output values.

In the example of FIG. 2, the LUT output values of [0, 4, 16, 24, 28] are examples of mapped LUT output values that respectively map to each LUT input value. For example, the LUT input value of 0 maps to the LUT output value of 0, the LUT input of 1 maps to the LUT output value of 0, the LUT input of 2 maps to the LUT output value of 4, the LUT input of 3 maps to the LUT output value of 16, the LUT input of 4 maps to the LUT output value of 24, the LUT input of 5 maps to the LUT output value of 28, the LUT input of 6 maps to the LUT output value of 28, the LUT input of 7 maps to the LUT output value of 28. The LUT output values of [1, 2, 3, 5, 6, 7, 8, 9, 10, 11, 12, 13, 14, 15, 17, 18, 19, 20, 21, 22, 23, 25, 26, 27, 29, 30, 31] are examples of non-mapped LUT output values that do not respectively map to each LUT input value.

If the input is a smooth gradient going from 0 to 7, an abrupt jump may be noticed in the output where the input transitions from 2 to 3 and, to a lesser extent, from 3 to 4. For example, an input sequence of [0, 1, 2, 3, 4, 5, 6, 7] gets mapped to [0, 0, 4, 16, 24, 28, 28, 28]. The jump from 4 to 16 in the output is an example of a gap, and the jump from 16 to 24 in the output is another example of a gap. Processing unit 1 may be configured to use a dithering technique that may reduce or prevent the introduction of such gaps, which may result in reducing or preventing the introduction of contour artifacts (e.g., banding). For example, processing unit 1 may introduce random or non-random variation at the input of a LUT.

It is understood that introducing variation at the input of a LUT (e.g., one or more techniques described herein) is different than introducing variation to the input of a LUT (e.g., dithering the input pixel value input and using the dithered pixel value input as the input value into the LUT). For example, processing unit 1 may be configured to input a pixel value corresponding to pixel position (x,y) into a LUT, where (x, y) corresponds to any pixel position in an image. As one example, a pixel at position (3, 4) in an image may include three pixel values. One of the three pixel values may be represented as an 8-bit value. Processing unit 1 may be configured to use the 8-bit value as the input to the LUT and apply variation (e.g., dithering) at the input of the LUT instead of, for example, dithering the input pixel value itself (e.g., dithering the 8-bit value to an n-bit value where n is greater than, less than, or equal to 8) and using the dithered input pixel value as the input to the LUT.

For example, processing unit 1 may be configured to use dithering to produce outputs that vary between the corresponding table entry (i.e., the LUT input value corresponding to the pixel value entering the LUT) and its adjacent and/or non-adjacent neighbor(s) in the LUT. Dithering the pixel value before inputting the value into the LUT may be considered undesirable in some examples. However, in other examples, processing unit 1 may be configured to first dither the pixel value, use the dithered pixel value as the input to the LUT, and then dither the LUT input value as described herein. Therefore, while the LUT input value may be described herein as being synonymous with the input pixel value, this is because processing unit 1 may be configured to use a pixel value input to a LUT as the LUT input value. However, dithering the LUT input value is different than dithering the pixel value input into the LUT. For example, a pixel value may correspond to a first LUT input value before dithering. After dithering the pixel value, the dithered pixel value may correspond to a second LUT input value instead of the first LUT input value. By dithering the pixel value before entering the LUT, corruption is encountered. Processing unit 1 may be configured to dither the LUT input value instead of the actual pixel value to avoid corrupting the data input into the LUT. Accordingly, it is understood that the terms pixel value and LUT input value may be used interchangeably herein in examples where processing unit 1 may be configured to use the input pixel value as the LUT input value. It is also understood that dithering the pixel value is different from dithering the LUT input value corresponding to the pixel value. For example, if the pixel value is dithered, then the terms pixel value and LUT input value may not be used interchangeably herein. Instead, in this example, the terms dithered pixel value and LUT input value may be used interchangeably.

The random or non-random noise that processing unit 1 may be configured to introduce at the input of a LUT may be translated into variation at the output of the LUT by one or more techniques described herein resulting in the generation of intermediate values where normally a gap or missing output values (e.g., non-mapped output values) would exist. As one example, referring to the example shown in FIG. 2, one or more non-mapped LUT output values (e.g., one or more output pixel values not mapped to an input pixel value) could appear in the output using one or more techniques described herein despite the LUT not explicitly mapping an input pixel value to such one or more non-mapped LUT output values (e.g., output pixel values 5 to 15 and others in the example shown in FIG. 2).

In some examples, processing unit 1 may be configured to perform one or more techniques described herein as well as dither the input to a LUT and/or dither the output value of a LUT. Dithering the output of a LUT is to be distinguished from interpolating a LUT output value. For example, a pixel at position (4, 7) in an image may include three pixel values. One of the three pixel values may be represented as an 8-bit value. Processing unit 1 may be configured to use the 8-bit value as the input to the LUT. The LUT input value may map to a LUT output value. Instead of outputting the mapped LUT output value (in some examples), processing unit 1 may be configured to interpolate a LUT output value for the LUT input value in accordance with one or more techniques described herein. The interpolated LUT output value for the LUT input value may be different than the LUT output value that maps to the LUT input value being processed. Next, processing unit 1 may be configured to then dither (e.g., apply variation to) the interpolated LUT output value.

Figure 4:
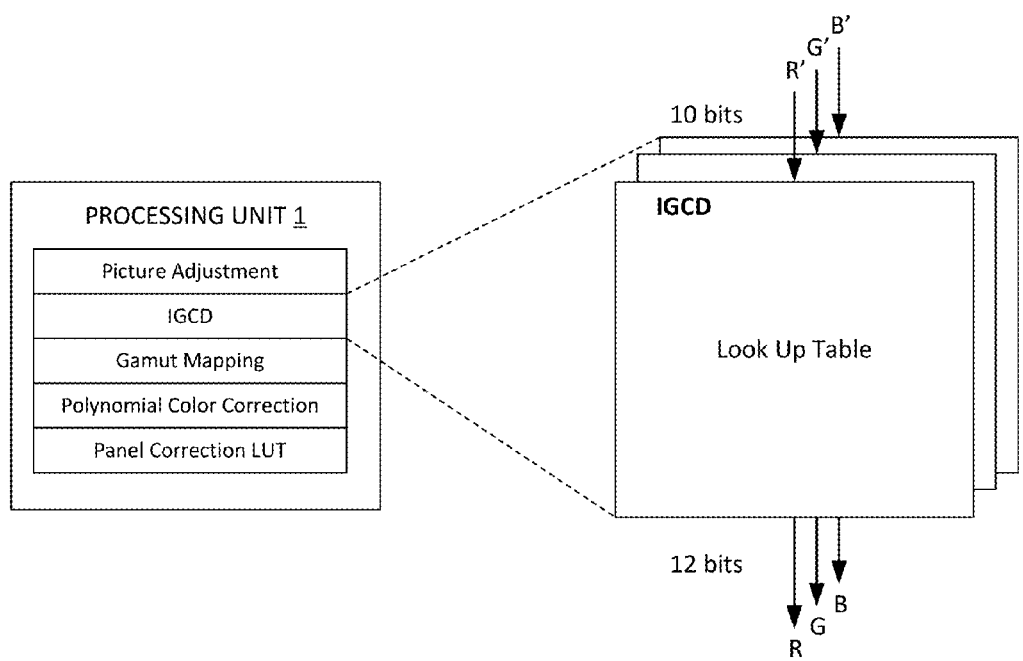
FIG. 4 is a block diagram showing an example processing unit configured to use the techniques of this disclosure.

FIG. 4 shows one example of processing unit 1. In the example shown in FIG. 4, processing unit 1 is configured to perform image processing. For example, FIG. 4 depicts processing unit 1 as being configured to perform one or more techniques described herein for any image processing. For example, processing unit 1 may be configured to perform image processing such as forward gamma correction (GC), inverse gamma correction, gamma correction, contrast enhancement, contrast correction, color correction, color transform, tone mapping, inverse tone mapping, any image processing technique, or any combinations thereof. In some examples, such as the example shown, processing unit 1 may be configured to perform inverse gamma correction with dithering (IGCD) on R'G'B' channels in accordance with one or more techniques described herein. The dithering referred to here refers to one or more techniques of this disclosure. For example, as shown, processing unit 1 may be configured to perform IGCD such that a 10-bit R'G'B' gamma corrected input is converted to a 12-bit RGB (linear light) output using a look up table (LUT) in accordance with one or more techniques described herein. In some examples, the IGCD may be programmed by software such that when executed by processing unit 1, processing unit 1 is configured to match an opto-electronic transfer function used to encode the source content. For example, IGCD may be performed to convert a gamma corrected R'G'B' input to a linear light RGB output.

In some examples, a look up table (LUT) may be constrained by software and/or hardware to be monotonically increasing. However, the difference in value between adjacent LUT entries may vary. For example, the increase in value from one LUT entry to the next LUT entry may vary. As such, there may be some gaps that are larger than others. These larger gaps may introduce gaps in the output that are visibly identifiable in the displayed image of an image processing technique using one or more LUTs. Such visibly identifiable gaps in an output from image processing may result in (or otherwise be referred to as) image processing artifacts, such as contour artifacts (e.g., banding). For example, when the source content (e.g., input content such as an input image) contains smooth gradients, LUT gaps can result in visual artifacts such as contouring artifacts (e.g., banding artifacts). The image processing techniques described herein include a dithering technique that may reduce or prevent the introduction of contour artifacts to an input image. The image processing techniques described herein include a dithering technique that may reduce or remove existing contour artifacts from an input image.

The example shown in FIG. 4 is just one example of an image processing technique (e.g., inverse gamma correction) implemented with one or more dithering techniques described herein to reduce or prevent the introduction of contour artifacts during the image processing (the inverse gamma correction in this example).

One or more techniques of this disclosure may apply to examples where the pixel size (e.g., bits per pixel or bpp) of an input image is increased, decreased, or remains the same depending on the image processing being performed. For example, as shown in the example of FIG. 4, 10-bit pixel values or representations (e.g., 10 bits per pixel or 10 bpp) corresponding to an image may be increased to 12-bit pixel values or representations using one or more LUTs. One or more different LUTs may correspond to one or more pixel values. For example, referring to the RGB example, one or more LUTs may correspond to the R channel, one or more LUTs may correspond to the G channel, and one or more LUTs may correspond to the B channel. In some examples, the one or more LUTs corresponding to the R, G, and B channels respectively may be the same or different. For example, a simplified approach may be implemented where the same one or more LUTs may be used for each channel.

FIG. 5 is a block diagram illustrating an example computing device that may be configured to implement one or more aspects of this disclosure. As shown in FIG. 5, computing device 2 may be, for example, a personal computer, a desktop computer, a laptop computer, a tablet computer, a computer workstation, a video game platform or console, a mobile telephone (e.g., a cellular or satellite telephone), a landline telephone, an Internet telephone, a handheld device (e.g., a portable video game device or a personal digital assistant (PDA)), a wearable computing device, a personal music player, a video player, a display (e.g., display device), a television, a television set-top box, a server, an intermediate network device, a mainframe computer, any mobile device, or any other type of device that processes and/or displays graphical data. In the example of FIG. 5, computing device 2 may include central processing unit (CPU) 6, system memory 10, and graphics processing unit (GPU) 12. CPU 6 may be configured to perform image processing in accordance with one or more techniques described herein. GPU 12 may be configured to perform image processing in accordance with one or more techniques described herein.

Computing device 2 may also include display processor 14, transceiver 3, user interface 4, video codec 7, and display 8. In some examples, video codec 7 may be a software application, such as a software application among the one or more software applications 18 configured to be processed by CPU 6 or other components of computing device 2. In other examples, video codec 7 may be a hardware component different from CPU 6, a software application that runs on a component different from CPU 6, or a combination of hardware and software. While the one or more software applications 18 are conceptually shown as inside CPU 6, it is understood that these one or more software applications 18 may be stored in system memory 10, memory external to but accessible to computing device 2, or a combination thereof. The external memory may, for example, be continuously intermittently accessible to computing device 2.

Display processor 14 may be configured to perform image processing in accordance with one or more techniques described herein. Display processor 14 may comprise a pixel processing unit that may implement one or more techniques described herein. Display processor 14 may, for example, utilize a tile-based architecture or a line-based architecture. In some examples, a tile is an area representation of pixels comprising a height and width with the height being one or more pixels and the width being one or more pixels. In such examples, tiles may be rectangular or square in nature. In other examples, a tile may be a shape different than a square or a rectangle.

Display processor 14 may fetch multiple image layers (e.g., foreground and background) from at least one memory. For example, display processor 14 may fetch image layers from a frame buffer to which a GPU outputs graphical data in the form of pixel representations and/or other memory. As another example, display processor 14 may fetch image layers from on-chip memory of video codec 7, on-chip memory of GPU 12, output buffer 16, output buffer 17, system memory 10, or any other source or memory space. The multiple image layers may include foreground layers and/or background layers.

Display processor 14 may process pixels from multiple layers. Example pixel processing that may be performed by display processor 14 may includes up-sampling, downsampling, scaling, rotation, and other pixel processing. For example, display processor 14 may process pixels associated with foreground image layers and/or background image layers. Display processor 14 may blend pixels from multiple layers, and write back the blended pixels into memory in tile format. Then, the blended pixels may be read from memory in raster format and sent to display 8 for presentment.

Video codec 7 may receive encoded video data. Computing device 2 may receive encoded video data from, for example, a storage medium, a network server, or a source device (e.g., a device that encoded the data or otherwise transmitted the encoded video data to computing device 2, such as a server). In other examples, computing device 2 may itself generate the encoded video data. For example, computing device 2 may include a camera for capturing still images or video. The captured data (e.g., video data) may be encoded by video codec 7. Encoded video data may include a variety of syntax elements generated by a video encoder for use by a video decoder, such as video codec 7, in decoding the video data.

While video codec 7 is described herein as being both a video encoder and video decoder, it is understood that video codec 7 may be a video decoder without encoding functionality in other examples. Video codec 7 may be configured to perform image processing in accordance with one or more techniques described herein. Video data decoded and/or processed by video codec 7 may be sent to any destination. For example, decoded video data may be sent directly to display processor 14, may be sent directly to display 8, or may be sent to memory accessible to display processor 14 or GPU 12 such as system memory 10, output buffer 16, or output buffer 17. In the example shown, video codec 7 is connected to display processor 14, meaning that decoded video data is sent directly to display processor 14 and/or stored in memory accessible to display processor 14. In such an example, display processor 14 may issue one or more memory requests to obtain decoded video data from memory in a similar manner as when issuing one or more memory requests to obtain graphical (still image or video) data from memory (e.g., output buffer 16) associated with GPU 12.

Video codec 7 may operate according to a video compression standard, such as the ITU-T H.264, Advanced Video Coding (AVC), or ITU-T H.265, High Efficiency Video Coding (HEVC), standards. The techniques of this disclosure, however, are not limited to any particular coding standard.

Transceiver 3, video codec 7, and display processor 14 may be part of the same integrated circuit (IC) as CPU 6 and/or GPU 12, may be external to the IC or ICs that include CPU 6 and/or GPU 12, or may be formed in the IC that is external to the IC that includes CPU 6 and/or GPU 12. For example, video codec 7 may be implemented as any of a variety of suitable encoder circuitry, such as one or more microprocessors, digital signal processors (DSPs), application specific integrated circuits (ASICs), field programmable gate arrays (FPGAs), arithmetic logic units (ALUs), discrete logic, software, hardware, firmware or any combinations thereof.

Computing device 2 may include additional modules or processing units not shown in FIG. 5 for purposes of clarity. For example, computing device 2 may include a speaker and a microphone, neither of which are shown in FIG. 5, to effectuate telephonic communications in examples where computing device 2 is a mobile wireless telephone, or a speaker where computing device 2 is a media player. Computing device 2 may also include a camera. Furthermore, the various modules and units shown in computing device 2 may not be necessary in every example of computing device 2. For example, user interface 4 and display 8 may be external to computing device 2 in examples where computing device 2 is a desktop computer or other device that is equipped to interface with an external user interface or display.

Examples of user interface 4 include, but are not limited to, a trackball, a mouse, a keyboard, and other types of input devices. User interface 4 may also be a touch screen and may be incorporated as a part of display 8. Transceiver 3 may include circuitry to allow wireless or wired communication between computing device 2 and another device or a network. Transceiver 3 may include modulators, demodulators, amplifiers and other such circuitry for wired or wireless communication. In some examples, transceiver 3 may be integrated with CPU 6.

CPU 6 may be a microprocessor, such as a central processing unit (CPU) configured to process instructions of a computer program for execution. CPU 6 may comprise a general-purpose or a special-purpose processor that controls operation of computing device 2. A user may provide input to computing device 2 to cause CPU 6 to execute one or more software applications, such as one or more software application 18. The one or more software applications 18 that execute on CPU 6 (or on one or more other components of computing device 2) may include, for example, an operating system, a word processor application, an email application, a spreadsheet application, a media player application, a video game application, a graphical user interface application, or another type of software application that uses graphical data for 2D or 3D graphics. As described herein, processing unit 1 may be, for example, one or more components described with respect to FIG. 5. Accordingly it is understood, for example, that processing unit 1 may be configured to execute one or software applications (e.g., one or more software application 18). Any description relating to any component of FIG. 5 may equally describe one or more examples of processing unit 1.

CPU 6 may be configured to execute GPU driver 22 for controlling the operation of GPU 12. The user may provide input to computing device 2 via one or more input devices (not shown) such as a keyboard, a mouse, a microphone, a touch pad or another input device that is coupled to computing device 2 via user interface 4.

One or more software applications 18 that execute on, for example, CPU 6 may include one or more graphics rendering instructions that instruct CPU 6 to cause the rendering of graphics data to display 8. The instructions may include instructions to process 3D graphics as well as instructions to process 2D graphics. In some examples, the software instructions may conform to a graphics application programming interface (API). Graphics API may be, for example, an Open Graphics Library (OpenGL®) API, an Open Graphics Library Embedded Systems (OpenGL ES) API, a Direct3D API, an X3D API, a RenderMan API, a WebGL API, an Open Computing Language (OpenCL™), a parallel computing platform and API model developed by NVIDIA Corporation such as CUDA (i.e., Compute Unified Device Architecture), or any other public or proprietary standard GPU compute API. In order to process the graphics rendering instructions of one or more software applications 18 executing on CPU 6, CPU 6, during execution of one or more software applications 18, may issue one or more graphics rendering commands to GPU 12 (e.g., through GPU driver 22) to cause GPU 12 to perform some or all of the rendering of the graphics data. In some examples, the graphics data to be rendered may include a list of graphics primitives, e.g., points, lines, triangles, quadrilaterals, triangle strips, etc.

One or more software applications 18 may be any application that utilizes any functionality of GPU 12 or that does not utilize any functionality of GPU 12. For example, one or more applications 18 may be any application where execution by CPU 6 causes (or does not cause) one or more commands to be offloaded to GPU 12 for processing. Examples of one or more applications 18 may include an application that causes CPU 6 to offload 3D rendering commands to GPU 12 (e.g., a video game application), an application that causes CPU 6 to offload 2D rendering commands to GPU 12 (e.g., a user interface application), or an application that causes CPU 6 to offload general compute tasks to GPU 12 (e.g., a GPGPU application). As another example, one or more applications 18 may include firmware resident on any component of computing device 2, such as CPU 6, GPU 12, display processor 14, or any other component. Firmware may or may not utilize or invoke the functionality of GPU 12.

One or more software applications 18 may include one or more drawing instructions that instruct GPU 12 to render a graphical user interface (GUI), a graphics scene, graphical data, or other graphics related data. For example, the drawing instructions may include instructions that define a set of one or more graphics primitives to be rendered by GPU 12. In some examples, the drawing instructions may, collectively, define all or part of a plurality of windowing surfaces used in a GUI. In additional examples, the drawing instructions may, collectively, define all or part of a graphics scene that includes one or more graphics objects within a model space or world space defined by the application.

One or more software applications 18 may invoke GPU driver 22, via graphics API, to issue one or more commands to GPU 12 for rendering one or more graphics primitives into displayable graphics images. For example, one or more software applications 18 may invoke GPU driver 22, via graphics API, to provide primitive definitions to GPU 12. In some instances, the primitive definitions may be provided to GPU 12 in the form of a list of drawing primitives, e.g., triangles, rectangles, triangle fans, triangle strips, etc. The primitive definitions may include vertex specifications that specify one or more vertices associated with the primitives to be rendered.

GPU 12 may be configured to perform graphics operations to render one or more graphics primitives to display 8. Thus, when one or more software applications 18 executing on CPU 6 requires graphics processing, CPU 6 may provide graphics rendering commands along with graphics data to GPU 12 for rendering to display 8. The graphics data may include, e.g., drawing commands, state information, primitive information, texture information, etc. GPU 12 may, in some instances, be built with a highly-parallel structure that provides more efficient processing of complex graphic-related operations than CPU 6. For example, GPU 12 may include a plurality of processing elements, such as shader units, that are configured to operate on multiple vertices or pixels in a parallel manner. The highly parallel nature of GPU 12 may, in some instances, allow GPU 12 to draw graphics images (e.g., GUIs and two-dimensional (2D) and/or three-dimensional (3D) graphics scenes) onto display 8 more quickly than drawing the scenes directly to display 8 using CPU 6.

One or more software applications 18 may invoke GPU driver 22, to issue one or more commands to GPU 12 for rendering one or more graphics primitives into displayable graphics images (e.g., displayable graphical data). For example, one or more software applications 18 may, when executed, invoke GPU driver 22 to provide primitive definitions to GPU 12. In some instances, the primitive definitions may be provided to GPU 12 in the form of a list of drawing primitives, e.g., triangles, rectangles, triangle fans, triangle strips, etc. The primitive definitions may include vertex specifications that specify one or more vertices associated with the primitives to be rendered. The vertex specifications may include positional coordinates for each vertex and, in some instances, other attributes associated with the vertex, such as, e.g., color coordinates, normal vectors, and texture coordinates. The primitive definitions may also include primitive type information (e.g., triangle, rectangle, triangle fan, triangle strip, etc.), scaling information, rotation information, and the like.

Based on the instructions issued by one or more software applications 18 to GPU driver 22, GPU driver 22 may formulate one or more commands that specify one or more operations for GPU 12 to perform in order to render the primitive. When GPU 12 receives a command from CPU 6, a graphics processing pipeline may execute on shader processors of GPU 12 to decode the command and to configure a graphics processing pipeline to perform the operation specified in the command. For example, an input-assembler in the graphics processing pipeline may read primitive data and assemble the data into primitives for use by the other graphics pipeline stages in a graphics processing pipeline. After performing the specified operations, the graphics processing pipeline outputs the rendered data to output buffer 16 accessible to display processor 14. In some examples, the graphics processing pipeline may include fixed function logic and/or be executed on programmable shader cores.

Output buffer 16 stores destination pixels for GPU 12. Each destination pixel may be associated with a unique screen pixel location. Similarly, output buffer 17 may store destination pixels for video codec 7 depending on the example. Output buffer 17 may be considered a frame buffer associated with video codec 7. In some examples, output buffer 16 and/or output buffer 17 may store color components and a destination alpha value for each destination pixel. For example, output buffer 16 and/or output buffer 17 may store pixel data according to any format. For example, output buffer 16 and/or output buffer 17 may store Red, Green, Blue, Alpha (RGBA) components for each pixel where the "RGB" components correspond to color values and the "A" component corresponds to a destination alpha value. As another example, output buffer 16 and/or output buffer 17 may store pixel data according to the YCbCr color format, YUV color format, RGB color format, or according to any other color format. Although output buffer 16 and system memory 10 are illustrated as being separate memory units, in other examples, output buffer 16 may be part of system memory 10. For example, output buffer 16 may be allocated memory space in system memory 10. Output buffer 16 may constitute a frame buffer. Further, as discussed above, output buffer 16 may also be able to store any suitable data other than pixels.

Similarly, although output buffer 17 and system memory 10 are illustrated as being separate memory units, in other examples, output buffer 17 may be part of system memory 10. For example, output buffer 17 may be allocated memory space in system memory 10. Output buffer 17 may constitute a video codec buffer or a frame buffer. Further, as discussed above, output buffer 17 may also be able to store any suitable data other than pixels. In some examples, although output buffer 16 and output buffer 17 are illustrated as being separate memory units, output buffer 16 and output buffer 17 may be the same buffer or different parts of the same buffer.

GPU 12 may, in some instances, be integrated into a motherboard of computing device 2. In other instances, GPU 12 may be present on a graphics card that is installed in a port in the motherboard of computing device 2 or may be otherwise incorporated within a peripheral device configured to interoperate with computing device 2. In some examples, GPU 12 may be on-chip with CPU 6, such as in a system on chip (SOC). GPU 12 may include one or more processors, such as one or more microprocessors, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. GPU 12 may also include one or more processor cores, so that GPU 12 may be referred to as a multi-core processor. In some examples, GPU 12 may be specialized hardware that includes integrated and/or discrete logic circuitry that provides GPU 12 with massive parallel processing capabilities suitable for graphics processing. In some instances, GPU 12 may also include general-purpose processing capabilities, and may be referred to as a general-purpose GPU (GPGPU) when implementing general-purpose processing tasks (e.g., so-called "compute" tasks).

In some examples, graphics memory 20 may be part of GPU 12. For example, graphics memory 20 may be on-chip memory or memory that is physically integrated into the integrated circuit chip of GPU 12. If graphics memory 20 is on-chip, GPU 12 may be able to read values from or write values to graphics memory 20 more quickly than reading values from or writing values to system memory 10 via a system bus. Thus, GPU 12 may read data from and write data to graphics memory 20 without using a bus. In other words, GPU 12 may process data locally using a local storage, instead of off-chip memory. Such graphics memory 20 may be referred to as on-chip memory. This allows GPU 12 to operate in a more efficient manner by eliminating the need of GPU 12 to read and write data via a bus, which may experience heavy bus traffic and associated contention for bandwidth. In some instances, however, GPU 12 may not include a separate memory, but instead utilize system memory 10 via a bus. Graphics memory 20 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media.

In some examples, GPU 12 may store a fully formed image in system memory 10. Display processor 14 may retrieve the image from system memory 10 and/or output buffer 16 and output values that cause the pixels of display 8 to illuminate to display the image. In some examples, display processor 14 may be configured to perform 2D operations on data to be displayed, including scaling, rotation, blending, and compositing. Display 8 may be the display of computing device 2 that displays the image content generated by GPU 12. Display 8 may be a liquid crystal display (LCD), an organic light emitting diode display (OLED), a cathode ray tube (CRT) display, a plasma display, or another type of display device. In some examples, display 8 may be integrated within computing device 2. For instance, display 8 may be a screen of a mobile telephone. In other examples, display 8 may be a stand-alone device coupled to computing device 2 via a wired or wireless communications link. For example, display 8 may be a computer monitor or flat panel display connected to a computing device (e.g., personal computer, mobile computer, tablet, mobile phone, etc.) via a cable or wireless link.

CPU 6 processes instructions for execution within computing device 2. CPU 6 may generate a command stream using a driver (e.g., GPU driver 22 which may be implemented in software executed by CPU 6) for execution by GPU 12. That is, CPU 6 may generate a command stream that defines a set of operations to be performed by GPU 12.

CPU 6 may generate a command stream to be executed by GPU 12 that causes viewable content to be displayed on display 8. For example, CPU 6 may generate a command stream that provides instructions for GPU 12 to render graphics data that may be stored in output buffer 16 for display at display 8. In this example, CPU 6 may generate a command stream that is executed by a graphics rendering pipeline.

Additionally or alternatively, CPU 6 may generate a command stream to be executed by GPU 12 that causes GPU 12 to perform other operations. For example, in some instances, CPU 6 may be a host processor that generates a command stream for using GPU 12 as a general purpose graphics processing unit (GPGPU). In this way, GPU 12 may act as a secondary processor for CPU 6. For example, GPU 12 may carry out a variety of general purpose computing functions traditionally carried out by CPU 6. Examples include a variety of image processing functions, including video decoding and post processing (e.g., deblocking, noise reduction, color correction, and the like) and other application specific image processing functions (e.g., facial detection/recognition, pattern recognition, wavelet transforms, and the like).

In some examples, GPU 12 may collaborate with CPU 6 to execute such GPGPU applications. For example, CPU 6 may offload certain functions to GPU 12 by providing GPU 12 with a command stream for execution by GPU 12. In this example, CPU 6 may be a host processor and GPU 12 may be a secondary processor. CPU 6 may communicate with GPU 12 to direct GPU 12 to execute GPGPU applications via GPU driver 22.

GPU driver 22 may communicate, to GPU 12, one or more command streams that may be executed by shader units of GPU 12. GPU 12 may include command processor 24 that may receive the one or more command streams from GPU driver 22. Command processor 24 may be any combination of hardware and software configured to receive and process one or more command streams. As such, command processor 24 is a stream processor. In some examples, instead of command processor 24, any other suitable stream processor may be usable in place of command processor 24 to receive and process one or more command streams and to perform the techniques disclosed herein. In one example, command processor 24 may be a hardware processor. In the example shown in FIG. 5, command processor 24 may be included in GPU 12. In other examples, command processor 24 may be a unit that is separate from CPU 6 and GPU 12. Command processor 24 may also be known as a stream processor, command/stream processor, and the like to indicate that it may be any processor configured to receive streams of commands and/or operations.

Command processor 24 may process one or more command streams including scheduling operations included in the one or more command streams for execution by GPU 12. Specifically, command processor 24 may process the one or more command streams and schedule the operations in the one or more command streams for execution by shader units 46. In operation, GPU driver 22 may send to command processor 24 a command stream comprising a series of operations to be executed by GPU 12. Command processor 24 may receive the stream of operations that comprise the command stream and may process the operations of the command stream sequentially based on the order of the operations in the command stream and may schedule the operations in the command stream for execution by shader processors of shader units of GPU 12.

Figure 6:
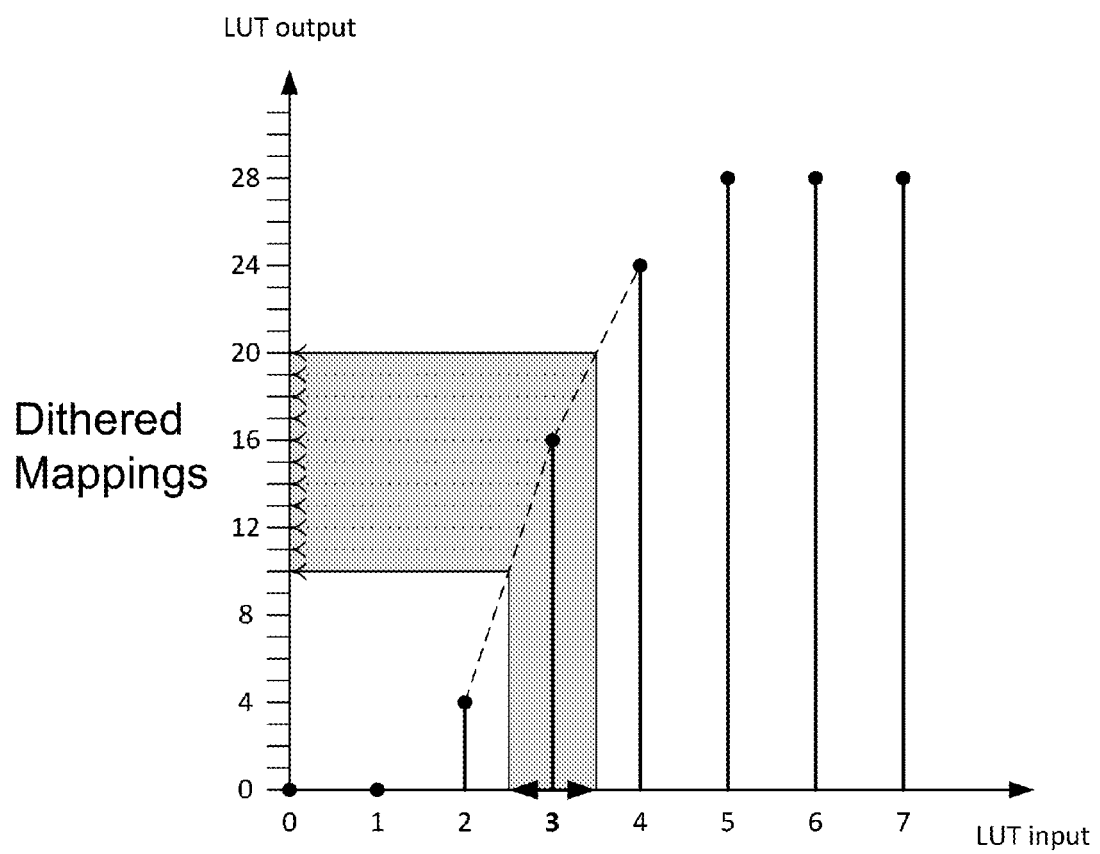
FIG. 6 shows one example of reducing or removing contour artifacts in accordance with one or more techniques described herein.

FIG. 6 shows one example of reducing or removing contour artifacts in accordance with one or more techniques described herein. Specifically, FIG. 6 illustrates the concept of adding variation (e.g., dither noise) at the LUT input (as opposed on or to the LUT input) and how this may translate to the LUT output. In the example shown, the LUT input is a 3-bit input having a value of 3 (or 011 in binary notation). Processing unit 1 may be configured to apply dither noise having an amplitude of plus and/or minus A (e.g., +/−A where A may be any value at or above zero) to one or more LUT input values. Depending on the example, variable A may be referred to as amplitude, dither strength amplitude, dither amplitude, dither strength, noise value, dither noise, dither noise amplitude, and the like.

In some examples, A may be equal to the maximum and minimum values of the following equation: C*NOISE_TABLE[m], where C is any value or the result of any equation.

In other examples, A may be equal to the maximum and minimum values of the following equation: $(B^{(N-Z)})*$(NOISE_TABLE[m]), where NOISE_TABLE may be an array including a plurality of different entries, and m is an integer and points to an array location in NOISE_TABLE. The NOISE_TABLE entries may be any integer value or non-integer value. In some examples, the NOISE_TABLE may be an R×R array or an S×R array where R and S are positive integer values and R does not equal S. In some examples, the arithmetic mean of all the entries (i.e., elements) of the NOISE_TABLE may be −0.5. Since −0.5 is close to zero, the dither noise may not impart a noticeable DC shift in the output image. In other examples, the arithmetic mean of all the entries (i.e., elements) of the NOISE_TABLE may be a value different than −0.5 (e.g., greater than or less than −0.5 that is close to 0 that may not impart a noticeable DC shift in the output image.

For example, if NOISE_TABLE=[−2, −1, 1, 0], then NOISE_TABLE[0]=−2, NOISE_TABLE[1]=−1, NOISE_TABLE[2]=1, and NOISE_TABLE[3]=0. In such examples, B may be the variable for the power base. In some examples, the value of B may be any positive integer value. N may be considered the programmable dither strength variable and Z may be any positive or negative integer or non-integer value. The variable N may likewise be any positive or negative integer or non-integer value. Since the value of each of these variables may change the outcome of the equation $B^{(N-Z)}$, each may be referred to as a programmable dither strength variable. In the example where NOISE_TABLE=[−2, −1, 1, 0], the amplitude may range from $(B^{(N-Z)})*(-2)$ to $(B^{(N-Z)})*(1)$. For example, assume that B=2, N=0, and Z=4. In this particular example, A may range from −0.125 to 0.0625 with two intermediate values of −0.0625 and 0.

In some examples, processing unit 1 may be configured with default values for B and Z. For example, the default value for B may be the value of 2 and the default value for Z may be the value 4. In this example, A may equal $2^{(N-4)}$ where N is the programmable dither strength variable. However, processing unit 1 may be configured to adjust any default value. For example, processing unit 1 may be configured to adjust Z from the default value to another value, such as the value of 3 or 5. In this example, A may equal $2^{(N-3)}$ or $2^{(N-5)}$, respectively. As another example, processing unit 1 may be configured to adjust B from the default value to another value, such as the value of 3. In this example, A may equal $3^{(N-4)}$. One or more variables B, N, and Z may, in some examples, be based on the bit-depth characteristic(s) of the content (e.g., image) being processed and/or the bit-depth of the processing pipeline.

In some examples, only the negative dithered noise may be applied, hence the dither noise having an amplitude of plus and/or minus A. In other examples, only the positive dither noise may be applied, hence the dither noise having an amplitude of plus and/or minus A. For example, if A is 0.1, then processing unit 1 may be configured to apply dither noise having an amplitude from −0.1 to 0.1. As another example, if A is 2, then processing unit 1 may be configured to apply dither noise having an amplitude from −2 to 2. As another example, if A is 4, then processing unit 1 may be configured to apply dither noise having an amplitude from 0 to 4 or from −4 to 0 in examples where the processing unit 1 is configured only to apply dither noise in the positive or negative direction. While A has been described as being the same value for both the minimum and maximum (e.g., if A=5, then the amplitude may be from −0.5 to 0.5), the term +/−A may also refer to examples where the minimum and maximum are different values. For example, the amplitude may range from −0.5 to 0.4375, −0.4375 to 0.5, or the like.

In the example shown in FIG. 6, A has a value of 0.5, which is depicted by the vertical shaded region extending from 2.5 to 3.5 based on the LUT input of 3 (i.e., 3 minus A (0.5 in this depicted example) equals 2.5, and 3 plus A (0.5 in this depicted example) equals 3.5. The range from 2.5 to 3.5 may be referred to as the input variation range, the dithered input variation range, the dithered LUT input range, the LUT input range, and the like. The dithered input variation range may be described as [LUT input value−A, LUT input value+A]. In examples where only the positive amplitude is used, the dithered input variation range may be described as [LUT input value, LUT input value+A]. In examples where only the negative amplitude is used, the dithered input variation range may be described as [LUT input value−A, LUT input value]. Following the dithering of the LUT input value, the LUT input value may be referred to as a dithered input LUT value.

In some examples, the value of A (or the generation of noise values) may be based on quantization error of a quantizer. In such examples, quantization error may refer to the quantization error of an analog-to-digital converter (A/D converter), which is one example of a quantizer. For example, if the A/D converter has a quantization error of +/−0.5 volts, then processing unit 1 may use the value of 0.5 so that the dither noise applied at the input of a LUT is +/−0.5. For example, FIG. 6 may depict, in some examples, processing unit 1 dithering at the input of the LUT for the LUT input value of 3 based on a quantization error of +/−0.5 volts. In this way, the techniques described herein may help mimic reality with intentional randomization since a quantizer, such as an A/D converter, obscures the true value (and therefore natural randomization) of the input signal by quantizing the signal. Therefore, while applying the dither noise as described herein may not (and likely not) result in the interpolated LUT output value being equal to the LUT output value that maps to the LUT input value, applying the dither noise as described herein for a plurality LUT value inputs may result in a more realistic output image. While the techniques described herein may apply to one or more LUT input values corresponding to one or more pixel input values, applying the techniques described herein to a plurality of LUT input values corresponding to a plurality of pixel input values may provide more noticeable effects, such as reducing or preventing contour artifacts when the pixel output values (i.e., LUT output values) are viewed in the aggregate.

In some examples, the techniques described herein may be applied to purposely introduce rather than remove or prevent contour artifacts. Processing unit 1 may be configured to adjust the dither strength high enough to introduce contour artifacts during image processing. In some examples, the introduction of contour artifacts may be deemed acceptable or even preferable because such artifacts may be considered artistic or the like. Processing unit 1 may be configured to (1) reduce or prevent the introduction of contour artifacts to an image during processing and/or remove contour artifacts in an image during image processing, and/or (2) increase or introduce contour artifacts during image processing. For example, processing unit 1 may be configured to process a first area of an image including a plurality of pixels to remove contour artifacts, and process a second area of an image including a plurality of pixels to add contour artifacts. As another example, processing unit 1 may be configured to reduce or prevent the introduction of contour artifacts for a first area of an image during image processing, and may be configured to remove contour artifacts for a second area of an image during image processing. In this regard, processing unit 1 may be configured to process one or more areas of an image in one or more ways. For example, processing unit 1 may be configured to determine whether an image includes one or more contour artifacts. Processing unit 1 may be configured to identify the one or more areas of the image determined to include one or more contour artifacts. Processing unit 1 may be configured to remove any contour artifacts in one or more areas of the image determined to include such artifacts during image processing, and may be configured to reduce or prevent the introduction of contour artifacts in the remaining part of the image during image processing.

In some examples, processing unit 1 may be configured to interpolate a LUT output value within a range of values. The range of values may refer to the dithered mappings or a subset thereof, such as the dithered mappings shown in FIG. 6 or the subsets shown in FIGS. 7 and 8. The range of values may be based on the value of A described herein. For example, processing unit 1 may be configured to interpolate a LUT output value within a range of values where the range of values includes (1) a first value of: a LUT input value adjacent to the LUT input value to be dithered, (2) a second value of: the LUT input value to be dithered, and (3) one or more values between the first and second values in this example. In some examples, the one or more values between the first and second values in this example and any of the examples that follow may include one or more mapped LUT output values, one or more non-mapped LUT output values, one or more non-integer LUT output values, or any combinations thereof.

In another example, processing unit 1 may be configured to interpolate a LUT output value within a range of values where the range of values includes (1) a first value of: a LUT input value not adjacent to the LUT input value to be dithered, (2) a second value of: the LUT input value to be dithered, and (3) one or more values between the first and second values in this example. In another example, processing unit 1 may be configured to interpolate a LUT output value within a range of values where the range of values includes (1) a first value of: a first LUT input value adjacent to the LUT input value to be dithered, (2) a second value of: a second LUT input value adjacent to the LUT input value to be dithered, and (3) one or more values between the first and second values in this example. In another example, processing unit 1 may be configured to interpolate a LUT output value within a range of values where the range of values includes (1) a first value of: a first LUT input value not adjacent to and less than the LUT input value to be dithered, (2) a second value of: a second LUT input value not adjacent to and greater than the LUT input value to be dithered, and (3) one or more values between the first and second values in this example.

In another example, processing unit 1 may be configured to interpolate a LUT output value within a range of values where the range of values includes (1) a first value of: a LUT input value adjacent to and less than the LUT input value to be dithered, (2) a second value of: a LUT input value not adjacent to and greater than the LUT input value to be dithered, and (3) one or more values between the first and second values in this example. In another example, processing unit 1 may be configured to interpolate a LUT output value within a range of values where the range of values includes (1) a first value of: a LUT input value adjacent to and greater than the LUT input value to be dithered, (2) a second value of: a LUT input value not adjacent to and less than the LUT input value to be dithered, and (3) one or more values between the first and second values in this example.

Referring to the specific example shown in FIG. 6, the LUT shown in FIG. 6 maps the eight possible input LUT values (e.g., the eight possible pixel values in a 3-bit color format that may be input to the LUT) to eight output LUT values among a possible 32 values (i.e., 0 to 31). FIG. 6 is one example of a LUT that maps a 3-bit pixel input value to a 5-bit pixel input value. In the depicted example, some of the output LUT values are mapped to more than one LUT input value. For example, according to the LUT mapping shown in FIG. 6, LUT input values of [0, 1, 2, 3, 4, 5, 6, 7] respectively map to the LUT output values of [0, 0, 4, 16, 24, 28, 28, 28].

The dithered range of [2.5, 3.5] (i.e., 2.5 to 3.5) is shown by the vertical shaded region extending from the x-axis. Although the LUT only maps select LUT input values to select LUT output values, processing unit 1 may be configured to use interpolation (e.g., linear interpolation) to produce non-mapped output LUT values (e.g., intermediate values between the mapped output LUT value and the output LUT value(s) corresponding to one or both of the adjacent LUT input values). For example, without dithering the LUT input value, processing unit 1 may be configured to process a LUT input value to produce (e.g., output) a LUT output value of 16. However, by dithering the LUT input value, processing unit may be configured to process a LUT input range of 2.5 to 3.5 for a LUT input value of 3 resulting in an output variation range from 10 to 20 (e.g., also represented as [10, 20]) instead of just the single value of 16. Because processing unit 1 amplified the input from a single input to a range of inputs (e.g., from 2.5 to 3.5), the number of possible output LUT values have been increased for the LUT input value of 3 such that instead of producing a static output LUT value of 16, a value amongst the range from 10 to 20 may be output for the LUT input value of 3.

In some examples, the interpolation of output values may be based on the slope of a piece-wise linear mapping curve. For example, the noise level may be applied or otherwise modulated according to the slope of the piece-wise linear mapping curve. FIG. 6 depicts this example of interpolation. The dotted line between the LUT input values of 2 and 3 is one piece-wise linear mapping curve, and the dotted line between the LUT input values of 3 and 4 is another piece-wise linear mapping curve. The slope of the piece-wise linear mapping curve is steeper for the LUT input range of 2.5 to 3 than it is for 3 to 3.5. As a result, in some examples, a steeper slope may correlate to more interpolated values being produced by processing unit 1 than for lesser sloped piece-wise curves. In the example of FIG. 6, this is the case with the possible LUT output values ranging from 10 to 16 for the LUT input range of 2.5 to 3 (having a greater piece-wise slope), and the possible LUT output values ranging from 16 to 20 for the LUT input range of 3 to 3.5 (having a lesser piece-wise slope).

In some examples, if the gap between the LUT input value and an adjacent LUT input value is small, the noise may be suppressed, and for larger gaps, the noise will be amplified. FIG. 6 shows this with the noise being suppressed for the LUT input range of 3 to 3.5 as shown by the output LUT values ranging from 16 to 20, and the noise being amplified for the LUT input range of 2.5 to 3 as shown by the output LUT values ranging from 10 to 16. In this way, processing unit 1 may be configured to automatically adjust the dither noise levels proportionally to any LUT output value gaps. For example, a larger gap may automatically receive more interpolated values compared to a smaller gap to "fill-in," remove, or reduce the gap such that the gap is less perceivable or not perceivable in the output image when displayed. As another example, a smaller gap may automatically receive less interpolated values compared to a larger gap to "fill-in," remove, or reduce the gap such that the gap is less perceivable or not perceivable in the output image when displayed.

In some examples, processing unit 1 may be configured to interpolate one or more output values corresponding to a dithered LUT input range. In one example, processing unit 1 may be configured to generate a noise value of $n_i$ (e.g., a particular value of the variable A described above, such as the minimum value of A, the maximum value of A, or any intermediate value of A between the minimum value and the maximum value). The noise value $n_i$ may be a random noise value or a non-random noise value. The noise value $n_i$ may be a random noise value or a non-random noise value generated within some programmable range, such as +/−k (e.g., the minimum and maximum of the variable A as described above, such as +/−0.5, +/−1, −0.5 to 0.75, −0.5 to 0.4375, etc.). The noise value $n_i$ may include one or more decimal places. If the value of $n_i$ generated by processing unit 1 is negative, the processing unit may be configured to perform low-side interpolation. If the value of $n_i$ generated by processing unit 1 is positive, the processing unit may be configured to perform high-side interpolation.

In some examples, processing unit 1 may be configured to generate the noise value $n_i$ using ordered dither. The ordered dither (e.g., spatial dither) may be static for a static input (e.g., a fixed noise pattern on a paused or repeating image in a video input). The dither value may be dependent upon pixel position and may have no temporally varying component, which may prevent flicker on static video for example. In other examples, processing unit 1 may be configured to generate the noise value $n_i$ such that the noise value varies with time (e.g., temporal dither) for a given pixel position.

Referring to ordered dither, processing unit 1 may be configured to determine the noise value $n_i$ based on the position of the pixel with which one or more LUT input values are associated. For example, an RGB color formatted pixel would have three LUT input values (one for each color channel) associated with a single pixel position.

In some examples, processing unit 1 may be configured to calculate a noise value based on pixel position. For example, processing unit 1 may be configured to calculate noise value of $n_i$ based on a pixel at position (x, y) as follows: $n_i$(x, y)=$2^{N-4}$(NOISE_TABLE[m]), where m=4·(y mod 4)+(x mod 4), 0≤m≤15, and where NOISE_TABLE=[7, −1, 5, −3, −5, 3, −7, 1, 4, −4, 6, −2, −8, 0, −6, 2].

This equation is exemplary in that A=$2^{(N-4)}$. For example, this equation may be simplified as $n_i$(x,y)=A*NOISE_TABLE[m], where A may be the variable for dither strength amplitude described herein. As described herein, A may be equal to $B^{(N-Z)}$ in some examples such that $n_i$(x,y)=($B^{(N-Z)}$)*NOISE_TABLE[m]). Also, in other examples, the NOISE_TABLE values may be different than shown in the array (shown in raster scan order above). In other examples, processing unit 1 may be configured to calculate a noise value independent of pixel position.

The $n_i$(x,y) equation translates to a 4×4 noise pattern matrix (or array) which gets tiled across the image being processed due to the periodic repetition of the NOISE_TABLE indexing caused by the modulo operands. In other examples, the periodic repetition of the NOISE_TABLE indexing in the equation above may be implemented using a technique different from using the modulo operands. In the equation above, the variable N is the programmable dither strength and enables processing unit 1 to be configured to amplify (or weaken) the dither. In some examples, N may be based on the bit-depth characteristic(s) of the content (e.g., image) being processed and/or the bit-depth of the processing pipeline. In some examples, N may control A (e.g., the variable A referred to herein regarding amplitude) in steps of power of 2. For example, when N=0, B=2, and Z=4, one or more entries (e.g., all entries) in the noise table (also referred to as NOISE_TABLE) is multiplied by $2^{(0-4)}$, which becomes $2^{-4}$ or otherwise $1/(2^4)$ equaling 1/16. So in this example, one or more values (e.g., all values) in the NOISE_TABLE may be multiplied by (1/16) effectively providing a dither noise amplitude ranging from −0.5 (e.g., the lowest noise table entry of −8 multiplied by 1/16) to 0.4375 (e.g., the highest noise table entry of 7 multiplied by 1/16). As another example, when N=1, B=2, and Z=4, the noise table (i.e., one or more entries in the noise table) is multiplied by $2^{(1-4)}$, which equals 1/8. So in this example, one or more values (e.g., all values) in the NOISE_TABLE may be multiplied by (1/8) effectively providing a dither noise amplitude ranging from −1.0 (e.g., the lowest noise table entry of −8 multiplied by 1/8) to 0.875 (e.g., the highest noise table entry of 7 multiplied by 1/16).

Spatially, the noise that may be generated by processing unit 1 may be a regular square grid tiling of a 4×4 matrix pattern. The example NOISE_TABLE depicted above is a raster scanned linear organization of the 4×4 matrix. In other examples, the matrix may be smaller or larger than a 4×4 matrix (e.g., 2×2, 8×8, etc.).

The equation above includes the modulo operand. The following includes examples of the modulo operand: 0 mod 4=0, 1 mod 4=1, 2 mod 4=2, 3 mod 4=3, 4 mod 4=0, 5 mod 4=1, 6 mod 4=2, 7 mod 4=3, 8 mod 4=0, 9 mod 4=1, 10 mod 4=2, 11 mod 4=3, 12 mod 4=0, 13 mod 4=1, 14 mod 4=2, etc. For example, applying the (x mod 4) operation to exemplary pixel positions of (0, 0), (1, 0), (2, 0), (3, 0), (4, 0), (5, 0), (6, 0), (7, 0), (8,0), and (9, 0) would result in the sequence of 0, 1, 2, 3, 1, 2, 3, 0, and 1 for the x-coordinates of the exemplary pixel positions, respectively. Similarly, applying the (y mod 4) operation to the same exemplary pixel positions would result in the sequence of 0, 0, 0, 0, 0, 0, 0, 0, 0, and 0 for the y-coordinates of these exemplary pixel positions, respectively.

As another example, applying the (y mod 4) operation to exemplary pixel positions of (0, 1), (0, 2), (0, 3), (0, 4), (0, 5), (0, 6), (0, 7), (0, 8), (0, 9) would result in the sequence of 0, 1, 2, 3, 1, 2, 3, 0, and 1 for the y-coordinates of the exemplary pixel positions, respectively. Similarly, applying the (x mod 4) operation to this exemplary pixel position set would result in the sequence of 0, 0, 0, 0, 0, 0, 0, 0, 0, and 0 for the x-coordinates of these exemplary pixel positions, respectively.

Derivation of the seed matrix (and the NOISE_TABLE entries described above) which the processing unit 1 may use to generate a 2×2, 4×4, 8×8 or M×M NOISE_TABLE matrix where M is any integer power of 2 is described below. In other examples, processing unit 1 may derive the seed matrix and NOISE_TABLE entries different than the technique described below. While this disclosure describes the use of a noise table (e.g., NOISE_TABLE), it is understood that processing unit 1 may be configured to perform one or more techniques of this disclosure with using a noise table. For example, processing unit 1 may be configured to use a different data structure or different algorithm to perform one or more techniques described herein.

The values of the NOISE_TABLE may be derived by processing unit 1 from Bayer's ordered dither matrices. Processing unit 1 may start the calculation of the NOISE_TABLE with the following fundamental 2×2 matrix:

$$D_2 = \begin{bmatrix} 3 & 1 \\ 0 & 2 \end{bmatrix}$$

The 2×2 matrix may be increased to, for example, a 4×4 matrix (e.g., $D_4$), an 8×8 matrix (e.g., $D_8$), and so forth (e.g., an n×n matrix denoted as $D_n$) using the following recursion equation:

$$D_n = \begin{bmatrix} 4D_{n/2} + D_2(1,1)U_{n/2} & 4D_{n/2} + D_2(1,2)U_{n/2} \\ 4D_{n/2} + D_2(2,1)U_{n/2} & 4D_{n/2} + D_2(2,2)U_{n/2} \end{bmatrix}$$

Using the above equation, processing unit 1 may produce a 4×4 matrix $D_4$. In the above equation, $U_n$ is a unit matrix of size n×n consisting of all ones. For example, a 2×2 matrix of [5, 5, 5, 5] (values shown in raster scan order) may also be represented as $5*U_2$. In the equation above, $D_2(a,b)U_{n/2}$ means a value of $D_2$ at (row a, column b) is multiplied by the unit matrix $U_{n/2}$ where the size of the unit matrix as well as the size of the output matrix (i.e., $D_n$) depends on the value of n. Accordingly, to calculate $D_4$, the equation above becomes:

$$D_4 = \begin{bmatrix} 4D_{4/2} + D_2(1,1)U_{4/2} & 4D_{4/2} + D_2(1,2)U_{4/2} \\ 4D_{4/2} + D_2(2,1)U_{4/2} & 4D_{4/2} + D_2(2,2)U_{4/2} \end{bmatrix}$$

The equation for $D_4$ above simplifies to:

$$D_4 = \begin{bmatrix} 4D_2 + D_2(1,1)U_2 & 4D_2 + D_2(1,2)U_2 \\ 4D_2 + D_2(2,1)U_2 & 4D_2 + D_2(2,2)U_2 \end{bmatrix}$$

The equation above then simplifies further to the following:

$$D_4 = \begin{bmatrix} 12+3 & 4+3 & 12+1 & 4+1 \\ 0+3 & 8+3 & 0+1 & 8+1 \\ 12+0 & 4+0 & 12+2 & 4+2 \\ 0+0 & 8+0 & 0+2 & 8+2 \end{bmatrix}$$

With this equation, $D_4$ equals the following 4×4 matrix:

$$D_4 = \begin{bmatrix} 15 & 7 & 13 & 5 \\ 3 & 11 & 1 & 9 \\ 12 & 4 & 14 & 6 \\ 0 & 8 & 2 & 10 \end{bmatrix}$$

Processing unit 1 may modify $D_4$ by subtracting the mean of $D_4$ (which in this example is (120/16), which may be rounded to the value of 8) to produce one example of a final matrix being 4×4 in size, such as:

$$\text{Adjusted } D_4 = \begin{bmatrix} 7 & -1 & 5 & -3 \\ -5 & 3 & -7 & 1 \\ 4 & -4 & 6 & -2 \\ -8 & 0 & -6 & 2 \end{bmatrix}$$

For example, the mean may be subtracted from the $D_4$ matrix values so that the mean becomes zero or close to zero, which may create noise that has a range of [−x/2, x/2] instead of [0, x]. In the example of $D_4$ shown, the arithmetic mean of all the elements of $D_4$ is 120 divided by 16, which equals 7.5. As described, the adjusted $D_4$ matrix is one example of a 4×4 noise table. For example, in the example shown, the mean was rounded up to 8. However, in other examples, the mean of any $D_n$ matrix may be rounded down instead of up (e.g., the mean of $D_4$ may be rounded down to 7 in the example above). In other examples, the mean of any $D_n$ matrix may be randomly or non-randomly assigned to any value between an adjacent or non-adjacent lower integer, and an adjacent or non-adjacent higher integer compared to the value of the mean itself (e.g., the mean of $D_4$ may be assigned any value between 7 and 8 since the mean is 7.5 in the example above). For purposes of understanding, FIG. 9 shows the computation of the NOISE_TABLE using the equation above in the commonly used Octave or MATLAB numerical analysis software packages. It is understood that processing unit 1 may be configured to perform or otherwise implement any function described throughout this disclosure.

While processing unit 1 has been described herein as being configured to generate the NOISE_TABLE or perform or otherwise calculate any equation in some examples, processing unit 1 may be configured to be pre-loaded with the NOISE_TABLE described herein or any other NOISE_TABLE. Similarly, processing unit 1 may be configured to be pre-loaded with any information described herein. For example, any pre-loaded information may be stored in internal memory 5 of processing unit 1. In other examples, any pre-loaded information may be stored in system memory 10 accessible to processing unit 1.

Referring to the adjusted $D_n$ (i.e., the $D_n$ matrix after the mean or some other value has been subtracted from each element to lower the mean of the matrix, which may also be referred to as a noise table), the arithmetic mean of all the elements may be zero, or any value close to 0 (e.g., any value between −1 and 1). For example, referring to the exemplary adjusted $D_4$ above (also the exemplary NOISE_TABLE described above), the arithmetic mean of all elements is −0.5. Since −0.5 is close to zero, the dither noise may not impart a noticeable DC shift in the output image that would otherwise result in brightness offsets or other image processing artifacts. In some examples, all of the columns of the adjusted $D_n$ (e.g., NOISE_TABLE) may also have a mean of zero, or any value close to 0 (e.g., any value between −1 and 1). For example, referring to the exemplary adjusted $D_4$ above (also the exemplary NOISE_TABLE described above), the arithmetic mean of each column is −0.5 which is close to zero meaning that the dither noise may not impart a noticeable DC shift in the output image that would otherwise result in brightness offsets.

Figure 7:
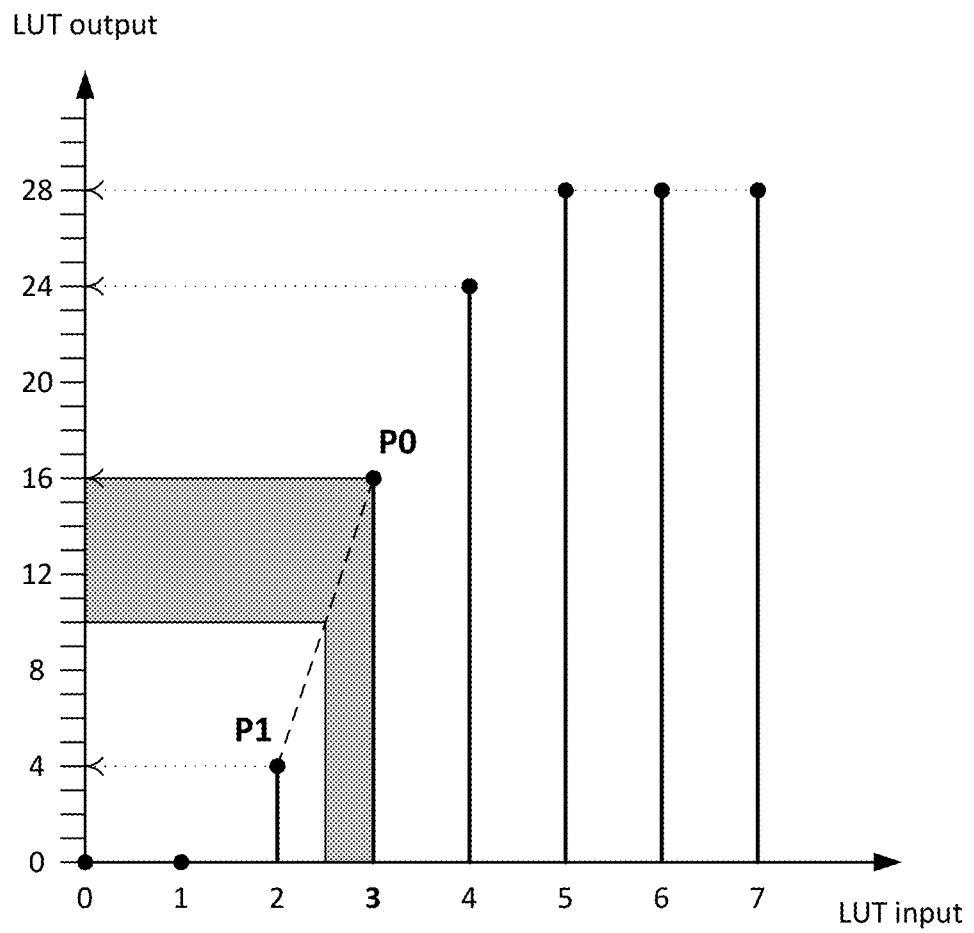
FIG. 7 shows one example of LUT output value interpolation according to one example of low-side interpolation.

FIG. 7 shows one example of LUT output value interpolation according to one example of low-side interpolation. In one example of low-side interpolation, processing unit 1 may be configured to use the LUT entry associated with the input pixel value together with the previous LUT entry. Processing unit 1 may be configured to use the two points (i.e., the current LUT input value and the previous LUT input value in the LUT) to calculate one or more interpolated LUT output values within the dithered input range. In the example shown in FIG. 7, low-side LUT output value interpolation is depicted for the LUT input value of 3. In the depicted example, the LUT input value of 2 is the previous LUT entry to the LUT input value of 3. Otherwise stated, LUT input value 3 is Point 0 (P0), and Point 1 (P1) is the previous LUT input value in the LUT used in the linear interpolation. The line connecting P0 and P1 illustrates the mapping of intermediate values (e.g., interpolated LUT output values).

In some examples, processing unit 1 may be configured to perform low-side interpolation as follows:

$$\text{output}_{low\text{-}side} = y_1 + \frac{(y_0 - y_1) \cdot (x - x_1)}{(x_0 - x_1)}$$

The values set forth in the equation above may be derived as follows: $P_0=(x_0, y_0)$ and $P_1=(x_1, y_1)$, where $y_0=LUT(x_0)$ and $y_1=LUT(x_1)$. $x=\text{input}+n_i$, where $x_1 \le x \le x_0$ and $n_i \le 0$ is the dither noise. As described herein, the variable $n_i$ may the same as variable A in some examples, and not correspond to A in other examples.

For example, assume that processing unit 1 receives a LUT input value of 3. Normally, the LUT input value of 3 would map to 16. Instead, however, processing unit 1 may be configured to perform LUT output value interpolation. In this example, processing unit 1 may be configured to generate a random noise value of +/−0.5. Assume for this example, the noise value generated is −0.5. Because $n_i$ is negative in value, processing unit 1 may be configured to perform low-side interpolation. With the LUT input value equaling 3, $P_0=(3, 16)$, $P_1=(2, 4)$, and x=2.5. Using these values, processing unit 1 may be configured to calculate an interpolated LUT output value of 10. As shown in FIG. 7, a dithered LUT input value of 2.5 corresponds to the interpolated LUT output value of 10.

In another example, assume that processing unit 1 again receives a LUT input value of 3. Processing unit 1 may again be configured to generate a random noise value of +/−0.5. However, assume for this particular example that the noise value generated is −0.3 triggering low-side LUT output value interpolation. With the LUT input value equaling 3, $P_0=(3, 16)$, $P_1=(2, 4)$, and x=2.7. Using these values, processing unit 1 may be configured to calculate an interpolated LUT output value of 12.4. However, a LUT output value of 12.4 is unavailable. Therefore, processing unit 1 may be configured to round the interpolated LUT output value to the nearest integer value with any value in the middle (12.5) being rounded up (e.g., 13) or down (e.g., 12) depending the example. In such an example, the interpolated LUT output value of 12.4 may be rounded down to 12. In other examples, processing unit 1 may be configured to truncate any decimal place(s) of an interpolated LUT output value. For example, an interpolated LUT output value of 12.4 may truncate to 12 and an interpolated LUT output value of 12.8 may also truncate to 12.

In other examples, processing unit 1 may be configured to add one or more least significant bits to represent a fractional component of the LUT output value. For example, instead of rounding or truncating an interpolated LUT output value to result in an integer value, processing unit 1 may be configured to round an interpolated LUT output value to the closest available fractional accuracy or a certain fractional accuracy. As one example, processing unit 1 may be configured to add one least significant bit to add fractional accuracy in increments of 0.5. In such an example, processing unit 1 may be configured to round 12.4 to 12.5 resulting in a binary representation of 011001 with the least significant bit of 1 representing 0.5 of 12.5. As another example, processing unit 1 may be configured to add two least significant bits to add fractional accuracy in increments of 0.25 (e.g., 00=0, 01=0.25, 10=0.5, and 11=0.75. In such an example, processing unit 1 may be configured to round 12.4 to 12.5 resulting in a binary representation of 0110010 with the least two significant bits of 10 representing 0.5 of 12.5. In another example, an interpolated LUT output value of 12.7 may be rounded to 12.75 resulting in a binary representation of 0110011 with the least two significant bits of 11 representing 0.75 of 12.75.

In other examples, processing unit 1 may be configured to add, not add, remove, not remove, or modify one or more least significant bits from, to, or in a binary representation, respectively. For example, processing unit 1 may be configured to do so to keep wordlength under control by pruning back at certain points during processing.

Figure 8:
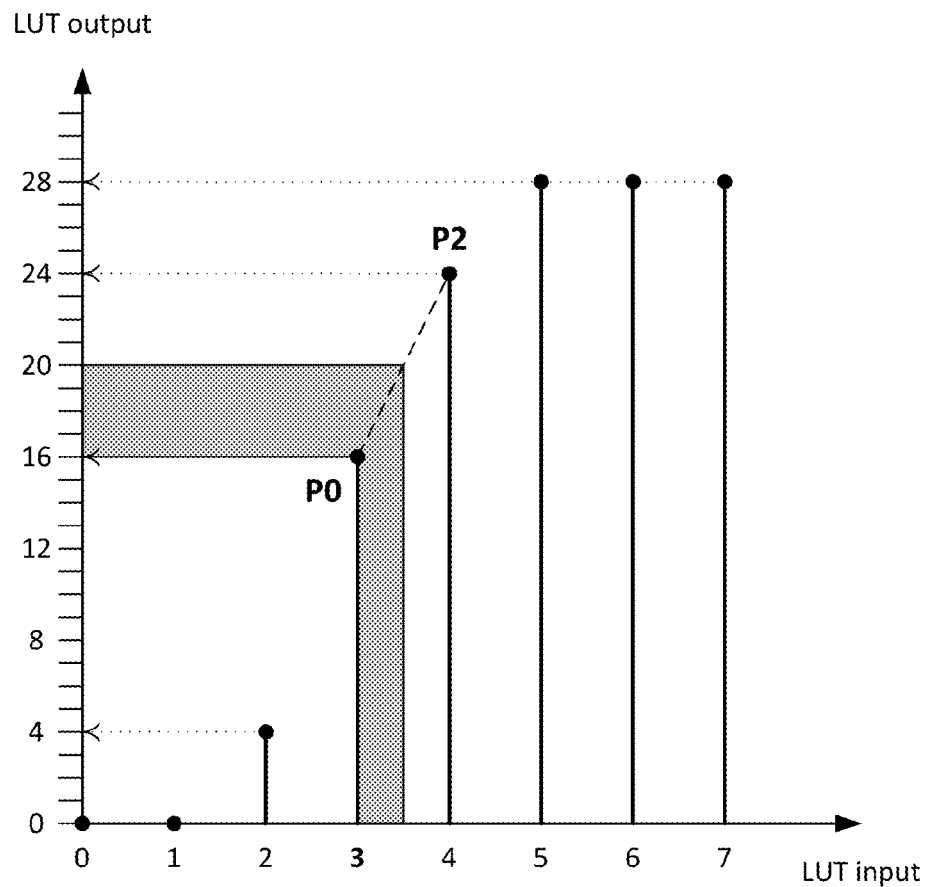
FIG. 8 shows one example of LUT output value interpolation according to one example of high-side interpolation.

FIG. 8 shows one example of LUT output value interpolation according to one example of high-side interpolation. In one example of high-side interpolation, processing unit 1 may be configured to use the LUT entry associated with the input pixel value together with the next LUT entry. Processing unit 1 may be configured to use the two points (i.e., the current LUT input value and the next LUT input value in the LUT) to calculate one or more interpolated LUT output values within the dithered input range. In the example shown in FIG. 8, high-side LUT output value interpolation is depicted for the LUT input value of 3. In the depicted example, the LUT input value of 4 is the next LUT entry to the LUT input value of 3. Otherwise stated, LUT input value 3 is Point 0 (P0), and Point 2 (P2) is the next LUT input value in the LUT used in the linear interpolation. The line connecting P0 and P2 illustrates the mapping of intermediate values (e.g., interpolated LUT output values).

In some examples, processing unit 1 may be configured to perform high-side interpolation as follows:

$$\text{output}_{high\text{-}side} = y_0 + \frac{(y_2 - y_0) \cdot (x - x_0)}{(x_2 - x_0)}$$

The values set forth in the equation above may be derived as follows: $P_0=(x_0, y_0)$ and $P_2=(x_2, y_2)$, where $y_0=LUT(x_0)$ and $y_2=LUT(x_2)$. $x=\text{input}+n_i$, where $x_0 \leq x \leq x_2$ and $n_i \geq 0$ is the dither noise.

For example, assume that processing unit 1 receives a LUT input value of 3. Normally, the LUT input value of 3 would map to 16. Instead, however, processing unit 1 may be configured to perform LUT output value interpolation. In this example, processing unit 1 may be configured to generate a random noise value of +/−0.5. Assume for this example, the noise value generated is 0.5. Because $n_i$ is positive in value, processing unit 1 may be configured to perform high-side interpolation. With the LUT input value equaling 3, $P_0=(3, 16)$, $P_2=(4, 24)$, and x=3.5. Using these values, processing unit 1 may be configured to calculate an interpolated LUT output value of 20. As shown in FIG. 8, a dithered LUT input value of 3.5 corresponds to the interpolated LUT output value of 20.

In another example, assume that processing unit 1 again receives a LUT input value of 3. Processing unit 1 may again be configured to generate a random noise value of +/−0.5. However, assume for this particular example that the noise value generated is 0.1 triggering high-side LUT output value interpolation. With the LUT input value equaling 3, $P_0=(3, 16)$, $P_2=(4, 24)$, and x=3.1. Using these values, processing unit 1 may be configured to calculate an interpolated LUT output value of 16.8. However, a LUT output value of 16.8 is unavailable. Therefore, processing unit 1 may be configured to round the interpolated LUT output value to the nearest integer value with any value in the middle (16.5) being rounded up (e.g., 17) or down (e.g., 16) depending the example. In such an example, the interpolated LUT output value of 16.8 may be rounded up to 17. In other examples, processing unit 1 may be configured to truncate any decimal place(s) of an interpolated LUT output value. For example, an interpolated LUT output value of 16.8 may truncate to 16.

In other examples, processing unit 1 may be configured to add one or more least significant bits to represent a fractional component of the LUT output value. For example, instead of rounding or truncating an interpolated LUT output value to result in an integer value, processing unit 1 may be configured to round an interpolated LUT output value to the closest available fractional accuracy. As one example, processing unit 1 may be configured to add one least significant bit to add fractional accuracy in increments of 0.5. In such an example, processing unit 1 may be configured to round 16.8 to 17 resulting in a binary representation of 10010 with the least significant bit of 0 representing 0.0 of 17.0. As another example, processing unit 1 may be configured to add two least significant bits to add fractional accuracy in increments of 0.25 (e.g., 00=0, 01=0.25, 10=0.5, and 11=0.75. In such an example, processing unit 1 may be configured to round 16.8 to 16.75 resulting in a binary representation of 1000111 with the least two significant bits of 11 representing 0.75 of 16.75.

In another example, assume that processing unit 1 receives a LUT input value of 4. Processing unit 1 may be configured to generate a random noise value of +/−0.5. However, assume for this particular example that the noise value generated is 0.0. In such an example, processing unit 1 may be configured to not perform interpolation. Instead, processing unit 1 may be configured to use the mapped LUT output value of 24 rather than triggering any interpolation (e.g., low-side or high-side LUT output value interpolation, or any other interpolation technique).

Referring to the low-side and high-side interpolations described above, two table looks-up may occur: one look-up for the LUT input value corresponding to the input pixel value, and a second look-up for the LUT input value that may be adjacent to the LUT input value corresponding to the input pixel value. As described herein, the second look-up may depend on whether the generated noise value is negative or positive. In some examples, processing unit 1 may be configured to not perform the two table look-ups described above in parallel even though this will decrease the data through-put of processing unit 1 (e.g., less than 1 pixel per clock cycle). For example, processing unit 1 may be configured to perform a first look-up using the LUT, and then following the first look-up, processing unit 1 may be configured to perform a second look-up using the LUT. In other examples, processing unit 1 may be configured to perform the two table look-ups described above in parallel to, for example, maintain data through-put of processing unit 1 (e.g., 1 pixel per clock cycle). For example, processing unit 1 may be configured to duplicate the LUT in memory so that the same LUT may be accessed in parallel for two different look-ups. As another example, processing unit 1 may be configured to perform the two table look-ups described above in parallel without duplication of the LUT. For example, processing unit 1 may be configured to divide the LUT into two halves, where one half LUT may include all of the even numbered entries while the other half LUT may include all of the odd numbered entries. By using two half-sized LUTs in this manner, processing unit 1 may be configured to prevent doubling memory consumption to store two instances of the same LUT or otherwise doubling the table size.

In other examples, processing unit 1 may be configured to calculate one or more interpolated LUT output values according to a methodology different than that described above with respect to FIGS. 7 and/or 8.

Figure 10:
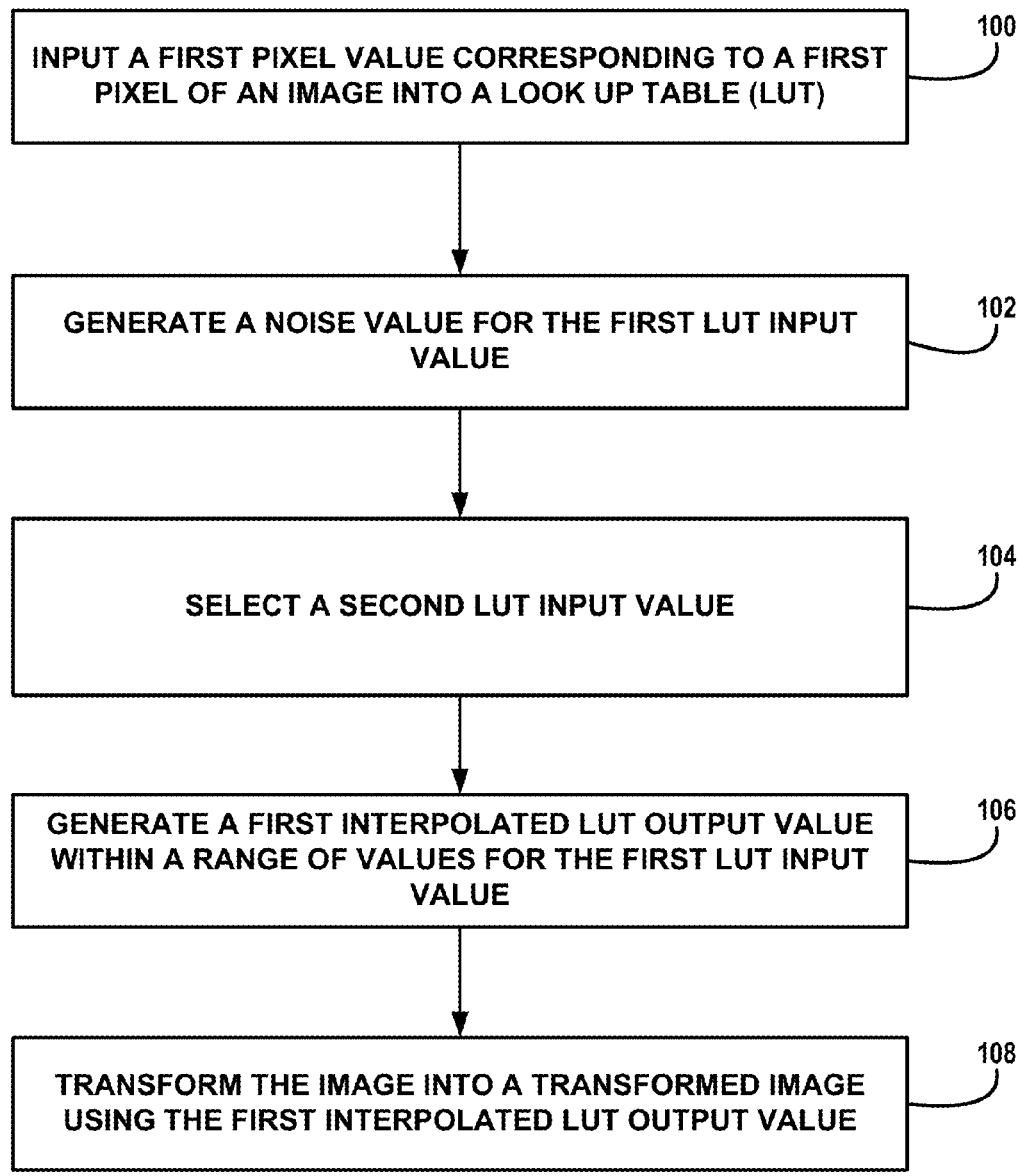
FIG. 10 is a flowchart showing an example method of the disclosure.

FIG. 10 is a flowchart showing an example method of the disclosure. The method of FIG. 10 may be carried out by one or more processing units 1 (e.g., one or more CPUs, one or more GPUs, one or more display processing units, one or more other processing units, or any combinations thereof). FIG. 10 depicts a method consistent with one or more techniques of this disclosure.

Processing unit 1 may be configured to input a first pixel value corresponding to a first pixel of an image into a Look Up Table (LUT) (100). The LUT may map one or more LUT input values to one or more LUT output values. The first pixel value may correspond to a first LUT input value that maps to a first LUT output value in the LUT. The first pixel may include one or more pixel values. Processing unit 1 may be configured to generate a noise value for the first LUT input value (102). Processing unit 1 may be configured to select a second LUT input value (104). The second LUT input value may map to a second LUT output value. In some examples, processing unit 1 may be configured to select a third LUT input value, which may map to a third LUT output value.

Processing unit 1 may be configured to generate a first interpolated LUT output value within a range of values for the first LUT input value (106). In some examples, processing unit 1 may be configured to generate a first interpolated LUT output value within a range of values for the first LUT input value based on one or more of the following: the noise value, the first LUT input value, the first LUT output value, the second LUT input value, and the second LUT output value. The first interpolated LUT output value may be a non-mapped LUT output value. In other examples, processing unit 1 may be configured to generate a first interpolated LUT output value within a range of values for the first LUT input value based on one or more of the following: the noise value, the third LUT input value, the third LUT output value, the second LUT input value, and the second LUT output value. In such examples, the second LUT input value and/or third LUT input value may or may not be adjacent to the first LUT input value. Processing unit 1 may be configured to transform the image into a transformed image using the first interpolated LUT output value (108).

Figure 11:
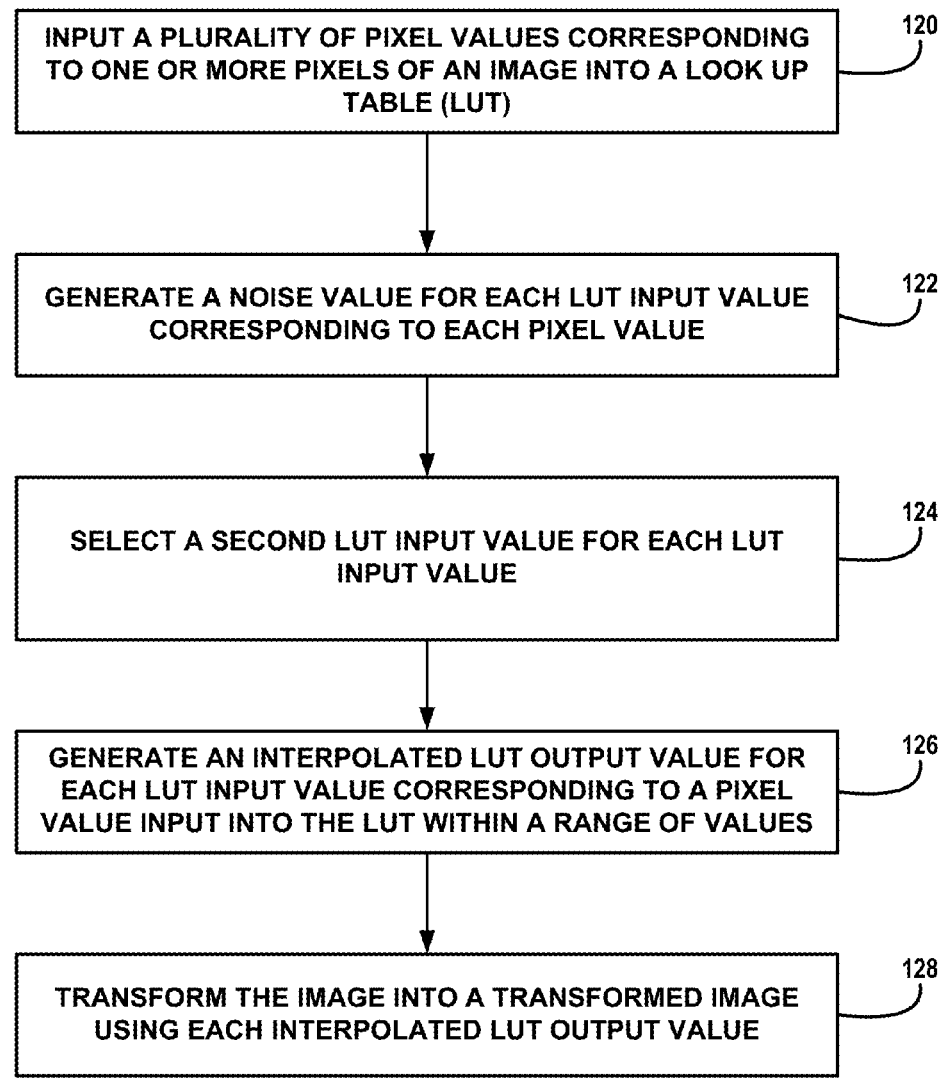
FIG. 11 is a flowchart showing an example method of the disclosure.

FIG. 11 is a flowchart showing an example method of the disclosure. The method of FIG. 11 may be carried out by one or more processing units 1 (e.g., one or more CPUs, one or more GPUs, one or more display processing units, one or more other processing units, or any combinations thereof). FIG. 11 depicts a method consistent with one or more techniques of this disclosure.

Processing unit 1 may be configured to input a plurality of pixel values corresponding to one or more pixels of an image into a Look Up Table (LUT) (120). The LUT may map one or more LUT input values to one or more LUT output values in the LUT. Each of the plurality of pixel values may respectively correspond to one of the one or more LUT input values that map to one of the one or more LUT output values. The one or more pixels may include one or more pixel values. Processing unit 1 may be configured to generate a noise value for each LUT input value corresponding to each pixel value (122). Processing unit 1 may be configured to select a second LUT input value for each LUT input value (124). The second LUT input value may map to a second LUT output value. In some examples, processing unit 1 may be configured to select a third LUT input value for each LUT input value. The third LUT input value map to a third LUT output value.

Processing unit 1 may be configured to generate an interpolated LUT output value for each LUT input value corresponding to a pixel value input into the LUT within a range of values (126). In some examples, processing unit 1 may be configured to generate an interpolated LUT output value for each LUT input value corresponding to a pixel value input into the LUT within a range of values based on one or more of the following: the noise value, the first LUT input value, the first LUT output value, the first LUT input value, and the second LUT output value respectively corresponding to each pixel value input into the LUT. At least one interpolated LUT output value may be a non-mapped LUT output value. In other examples, processing unit 1 may be configured to generate an interpolated LUT output value for each LUT input value corresponding to a pixel value input into the LUT within a range of values based on one or more of the following: the noise value, the third LUT input value, the third LUT output value, the second LUT input value, and the second LUT output value respectively corresponding to each pixel value input into the LUT. In such examples, the second LUT input value and/or third LUT input value may or may not be adjacent to the first LUT input value. Processing unit 1 may be configured to transform the image into a transformed image using each interpolated LUT output value (128).

Figure 12:
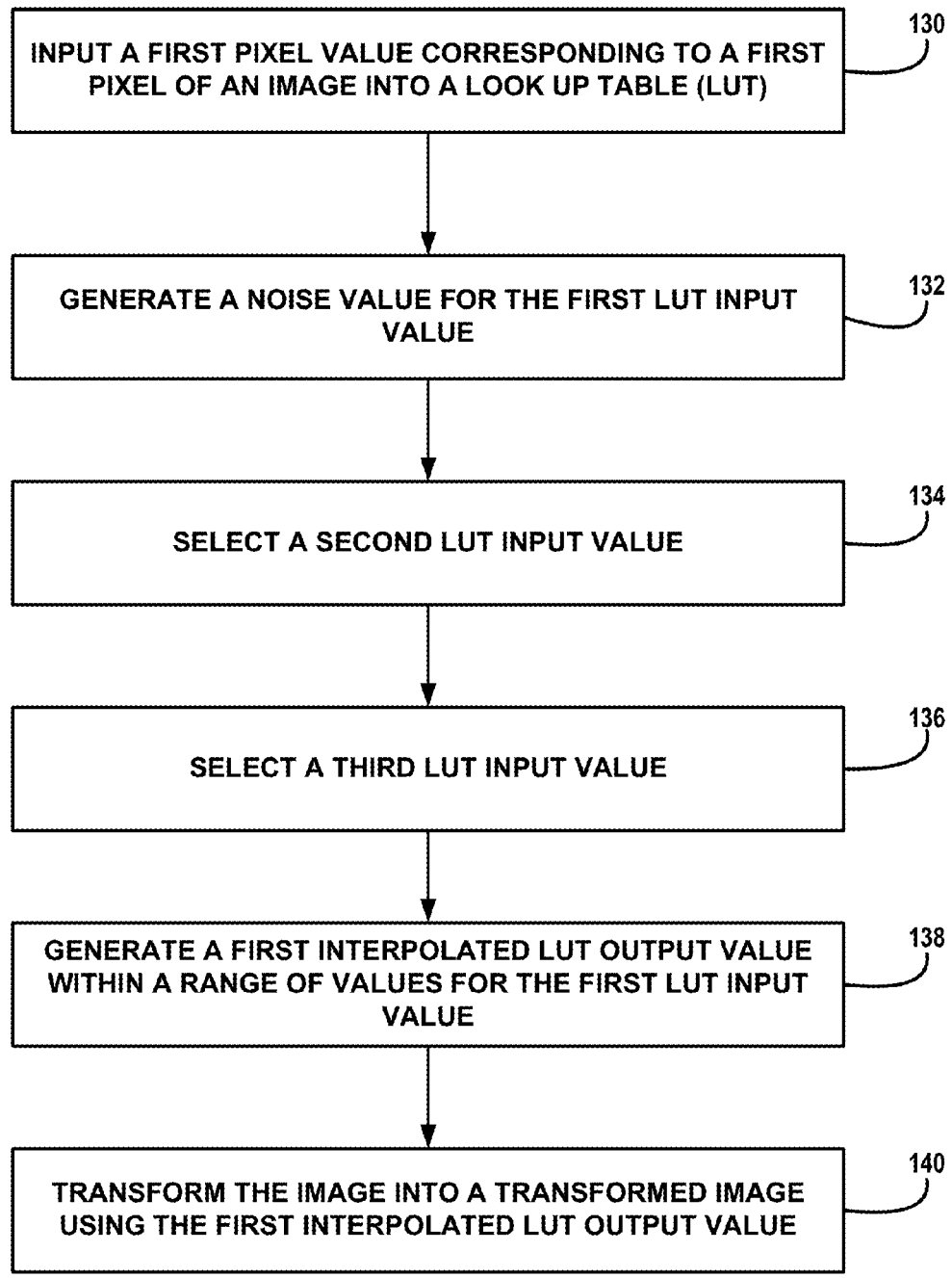
FIG. 12 is a flowchart showing an example method of the disclosure.

FIG. 12 is a flowchart showing an example method of the disclosure. The method of FIG. 12 may be carried out by one or more processing units 1 (e.g., one or more CPUs, one or more GPUs, one or more display processing units, one or more other processing units, or any combinations thereof). FIG. 12 depicts a method consistent with one or more techniques of this disclosure.

Processing unit 1 may be configured to input a first pixel value corresponding to a first pixel of an image into a Look Up Table (LUT) (130). The LUT may map one or more LUT input values to one or more LUT output values. The first pixel value may correspond to a first LUT input value that maps to a first LUT output value in the LUT. The first pixel may include one or more pixel values. Processing unit 1 may be configured to generate a noise value for the first LUT input value (132). Processing unit 1 may be configured to select a second LUT input value (134). The second LUT input value may map to a second LUT output value. Processing unit 1 may be configured to select a third LUT input value (136). The third LUT input value may map to a second LUT output value. The second LUT input value and/or third LUT input value may or may not be adjacent to the first LUT input value. In some examples, processing unit 1 may be configured to select the second LUT input value and/or the third LUT input value based one or more of the following: the noise value, adjacency of the second or third LUT input value to the first LUT input value, and non-adjacency of the second or third LUT input value to the first LUT input value.

Processing unit 1 may be configured to generate a first interpolated LUT output value within a range of values for the first LUT input value (138). In some examples, processing unit 1 may be configured to generate a first interpolated LUT output value within a range of values for the first LUT input value based on one or more of the following: the noise value, the third LUT input value, the third LUT output value, the second LUT input value, and the second LUT output value. The first interpolated LUT output value may be a non-mapped LUT output value. In other examples, processing unit 1 may be configured to generate a first interpolated LUT output value within a range of values for the first LUT input value based on one or more of the following: the noise value, the first LUT input value, the first LUT output value, the third LUT input value, the third LUT output value, the second LUT input value, and the second LUT output value. Processing unit 1 may be configured to transform the image into a transformed image using the first interpolated LUT output value (140).

Figure 13:
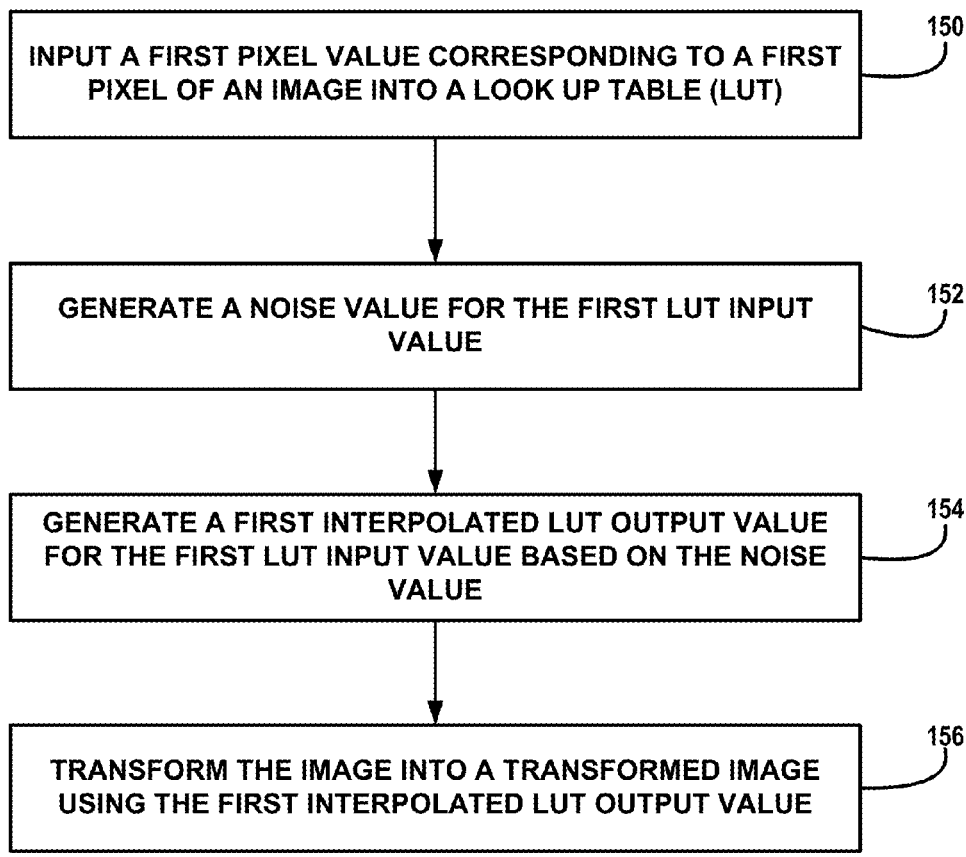
FIG. 13 is a flowchart showing an example method of the disclosure.

FIG. 13 is a flowchart showing an example method of the disclosure. The method of FIG. 13 may be carried out by one or more processing units 1 (e.g., one or more CPUs, one or more GPUs, one or more display processing units, one or more other processing units, or any combinations thereof). FIG. 13 depicts a method consistent with one or more techniques of this disclosure.

Processing unit 1 may be configured to input a first pixel value corresponding to a first pixel of the image into a Look Up Table (LUT) (150). The LUT may map one or more LUT input values to one or more LUT output values. The first pixel value may correspond to a first LUT input value that maps to a first LUT output value in the LUT. The first pixel may include one or more pixel values. Processing unit 1 may be configured to generate a noise value for the first LUT input value (152).

In some examples, the LUT may be a first LUT among two LUTs derived from a single LUT. The single LUT may map a plurality of LUT input values to one or more LUT output values. The first LUT may map a subset of the plurality of input values to the one or more LUT output values of the single LUT, and a second LUT derived from the single LUT may map a different subset of the plurality of input values to the one or more LUT output values of the single LUT.

Processing unit 1 may be configured to generate a first interpolated LUT output value for the first LUT input value based on the noise value (154). In some examples, the first interpolated LUT output value may be a non-mapped LUT output value. In some examples, processing unit 1 may be configured to select a second LUT input value. The second LUT input value may map to a second LUT output value. In some examples, processing unit 1 may be configured to generate the first interpolated LUT output value further based on at least one of the first LUT input value, the second LUT input value, and the second LUT output value.

In some examples, processing unit 1 may be configured to select a second and a third LUT input value. The second and the third LUT input value may respectively map to a second and third LUT output value. In some examples, processing unit 1 may be configured to generate the first interpolated LUT output value further based on at least one of the first LUT input value, the second LUT input value, the second LUT output value, the third LUT input value, and the third LUT output value. In some examples, processing unit 1 may be configured to select the second LUT input value or the third LUT input value based on at least one of the noise value, adjacency of the second or third LUT input value to the first LUT input value, and non-adjacency of the second or third LUT input value to the first LUT input value.

Processing unit 1 may be configured to transform the image into a transformed image using the first interpolated LUT output value (156).

Processing unit 1 may be configured to input a first pixel value corresponding to a second pixel of the image into the LUT. In some examples, processing unit 1 may be configured to process the first pixel value of the second pixel value in the same manner as the first pixel value of the first pixel described above. In other examples, the LUT that the first pixel value of the second pixel is input may be different than the LUT that the first pixel value of the first pixel is input. For example, the LUT may be a first LUT among two LUTs derived from a single LUT. The single LUT may map a plurality of LUT input values to one or more LUT output values. The first LUT may map a subset of the plurality of input values to the one or more LUT output values of the single LUT, and a second LUT derived from the single LUT may map a different subset of the plurality of input values to the one or more LUT output values of the single LUT.

Processing unit 1 may be configured to input the first pixel value of the first pixel into the first LUT derived from the single LUT, and input the first pixel value of the second pixel into the second LUT derived from the single LUT. In such examples, processing unit 1 may be configured to process the first pixel value of the second pixel value in the same manner as the first pixel value of the first pixel described above with one difference being the LUT into which the first pixel value for the first and second pixels is input.

Figure 14:
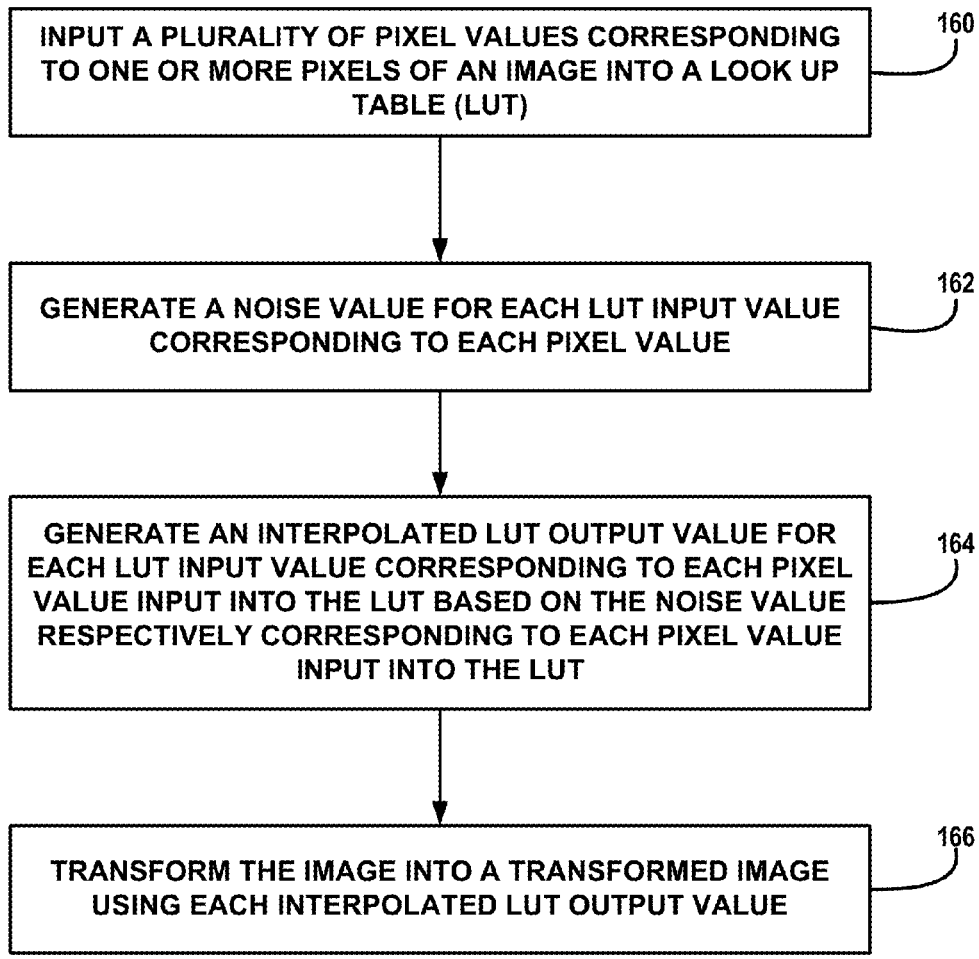
FIG. 14 is a flowchart showing an example method of the disclosure.

FIG. 14 is a flowchart showing an example method of the disclosure. The method of FIG. 14 may be carried out by one or more processing units 1 (e.g., one or more CPUs, one or more GPUs, one or more display processing units, one or more other processing units, or any combinations thereof). FIG. 14 depicts a method consistent with one or more techniques of this disclosure.

Processing unit 1 may be configured to input a plurality of pixel values corresponding to one or more pixels of an image into a Look Up Table (LUT) (160). The LUT may map one or more LUT input values to one or more LUT output values in the LUT. Each of the plurality of pixel values may respectively correspond to one of the one or more LUT input values that maps to one of the one or more LUT output values. The one or more pixels may include one or more pixel values. Processing unit 1 may be configured to generate a noise value for each LUT input value corresponding to each pixel value (162).

In some examples, the LUT may be a first LUT among two LUTs derived from a single LUT, wherein the single LUT maps a plurality of LUT input values to one or more LUT output values. The first LUT may map a subset of the plurality of input values to the one or more LUT output values of the single LUT, and a second LUT derived from the single LUT may map a different subset of the plurality of input values to the one or more LUT output values of the single LUT. In such examples, one or more pixels values corresponding to one or more pixels of the image may be input into the first LUT derived from the single LUT, and one or more pixel values corresponding to one or more pixels of the image may be input into the second LUT derived from the single LUT.

Processing unit 1 may be configured to generate an interpolated LUT output value for each LUT input value corresponding to each pixel value input into the LUT based on the noise value respectively corresponding to each pixel value input into the LUT (164). In some examples, at least one interpolated LUT output value may be a non-mapped LUT output value. In some examples, processing unit 1 may be configured to select a second LUT input value for each LUT input value. The second LUT input value may map to a second LUT output value. In some examples, processing unit 1 may be configured to generate the first interpolated LUT output value for each LUT input value corresponding to each pixel value input into the LUT further based on at least one of the first LUT input value, the second LUT input value, and the second LUT output value respectively corresponding to each pixel value input into the LUT.

In some examples, processing unit 1 may be configured to select a second and a third LUT input value for each LUT input value. The second and the third LUT input value may respectively map to a second and third LUT output value. In some examples, processing unit 1 may be configured to generate the first interpolated LUT output value for each LUT input value corresponding to each pixel value input into the LUT further based on at least one of the first LUT input value, the second LUT input value, the second LUT output, the third LUT input value, and the third LUT output value respectively corresponding to each pixel value input into the LUT. In some examples, processing unit 1 may be configured to select the second LUT input value or the third LUT input value for each LUT input value based on at least one of the noise value, adjacency of the second or third LUT input value to the first LUT input value, and non-adjacency of the second or third LUT input value to the first LUT input value respectively corresponding to each pixel value input into the LUT.

Processing unit 1 may be configured to transform the image into a transformed image using each interpolated LUT output value (166).

In accordance with this disclosure, the term "or" may be interrupted as "and/or" where context does not dictate otherwise. Additionally, while phrases such as "one or more" or "at least one" or the like may have been used for some features disclosed herein but not others; the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, it is understood that such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for image and/or video processing. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules or units are described in this disclosure to emphasize functional aspects of devices configured to perform the disclosed techniques, but do not necessarily require realization by different hardware units. Rather, as described above, various units may be combined in any hardware unit or provided by a collection of interoperative hardware units, including one or more processors as described above, in conjunction with suitable software and/or firmware.

Various examples have been described. These and other examples are within the scope of the following claims.

What is claimed is:
1. A method comprising:
inputting, by a processing unit, a first pixel value corresponding to a first pixel of an image into a Look Up Table (LUT), wherein the LUT maps one or more LUT input values to one or more LUT output values, and wherein the first pixel value corresponds to a first LUT input value that maps to a first LUT output value in the LUT;
applying noise to the first LUT input value to generate a noise-modified first LUT input value, wherein the noise is represented by a noise value;
generating, by the processing unit, a first interpolated LUT output value for the first LUT input value based on the noise-modified first LUT input value; and
transforming, by the processing unit, the image into a transformed image using the first interpolated LUT output value.

2. The method of claim 1, wherein the first interpolated LUT output value is a non-mapped LUT output value.

3. The method of claim 1, further comprising:
selecting, by the processing unit, a second LUT input value, wherein the second LUT input value maps to a second LUT output value.

4. The method of claim 3, further comprising:
generating, by the processing unit, the first interpolated LUT output value further based on at least one of the first LUT input value, the second LUT input value, and the second LUT output value.

5. The method of claim 3, wherein the LUT is a first LUT among two LUTs derived from a single LUT, wherein the single LUT maps a plurality of LUT input values to one or more LUT output values, wherein the first LUT maps a subset of the plurality of input values to the one or more LUT output values of the single LUT, and wherein a second LUT derived from the single LUT maps a different subset of the plurality of input values to the one or more LUT output values of the single LUT.

6. The method of claim 3, further comprising:
selecting, by the processing unit, a third LUT input value, wherein the third LUT input value maps to a third LUT output value.

7. The method of claim 6, further comprising:
generating, by the processing unit, the first interpolated LUT output value further based on at least one of the first LUT input value, the second LUT input value, the second LUT output value, the third LUT input value, and the third LUT output value.

8. The method of claim 6, further comprising:
selecting, by the processing unit, the second LUT input value or the third LUT input value based on at least one of the noise value, adjacency of the second or third LUT input value to the first LUT input value, and non-adjacency of the second or third LUT input value to the first LUT input value.

9. A device comprising:
a memory for storing an image; and
one or more processors configured to:
input a first pixel value corresponding to a first pixel of the image into a Look Up Table (LUT), wherein the LUT maps one or more LUT input values to one or more LUT output values, and wherein the first pixel value corresponds to a first LUT input value that maps to a first LUT output value in the LUT;
apply noise to the first LUT input value to generate a noise-modified first LUT input value, wherein the noise is represented by a noise value;
generate a first interpolated LUT output value for the first LUT input value based on the noise-modified first LUT input value; and
transform the image into a transformed image using the first interpolated LUT output value.

10. The device of claim 9, wherein the first interpolated LUT output value is a non-mapped LUT output value.

11. The device of claim 9, wherein the one or more processors are configured to:
select a second LUT input value, wherein the second LUT input value maps to a second LUT output value.

12. The device of claim 11, wherein the one or more processors are configured to:
generate the first interpolated LUT output value further based on at least one of the first LUT input value, the second LUT input value, and the second LUT output value.

13. The device of claim 11, wherein the LUT is a first LUT among two LUTs derived from a single LUT, wherein the single LUT maps a plurality of LUT input values to one or more LUT output values, wherein the first LUT maps a subset of the plurality of input values to the one or more LUT output values of the single LUT, and wherein a second LUT derived from the single LUT maps a different subset of the plurality of input values to the one or more LUT output values of the single LUT.

14. The device of claim 11, wherein the one or more processors are configured to:
select a third LUT input value, wherein the third LUT input value maps to a third LUT output value.

15. The device of claim 14, wherein the one or more processors are configured to:
generate the first interpolated LUT output value further based on at least one of the first LUT input value, the second LUT input value, the second LUT output value, the third LUT input value, and the third LUT output value.

16. The device of claim 14, wherein the one or more processors are configured to:
select the second LUT input value or the third LUT input value based on at least one of the noise value, adjacency of the second or third LUT input value to the first LUT input value, and non-adjacency of the second or third LUT input value to the first LUT input value.

17. An apparatus comprising:
means for inputting a first pixel value corresponding to a first pixel of an image into a Look Up Table (LUT), wherein the LUT maps one or more LUT input values to one or more LUT output values, and wherein the first pixel value corresponds to a first LUT input value that maps to a first LUT output value in the LUT;
means for applying noise to the first LUT input value to generate a noise-modified first LUT input value, wherein the noise is represented by a noise value;
means for generating a first interpolated LUT output value for the first LUT input value based on the noise-modified first LUT input value; and
means for transforming the image into a transformed image using the first interpolated LUT output value.

18. The apparatus of claim 17, wherein the first interpolated LUT output value is a non-mapped LUT output value.

19. The apparatus of claim 17, further comprising:
means for selecting a second LUT input value, wherein the second LUT input value maps to a second LUT output value.

20. The apparatus of claim 19, further comprising:
means for generating the first interpolated LUT output value further based on at least one of the first LUT input value, the second LUT input value, and the second LUT output value.

21. The apparatus of claim 19, wherein the LUT is a first LUT among two LUTs derived from a single LUT, wherein the single LUT maps a plurality of LUT input values to one or more LUT output values, wherein the first LUT maps a subset of the plurality of input values to the one or more LUT output values of the single LUT, and wherein a second LUT derived from the single LUT maps a different subset of the plurality of input values to the one or more LUT output values of the single LUT.

22. The apparatus of claim 19, further comprising:
means for selecting a third LUT input value, wherein the third LUT input value maps to a third LUT output value.

23. The apparatus of claim 22, further comprising:
means for generating the first interpolated LUT output value further based on at least one of the first LUT input value, the second LUT input value, the second LUT output value, the third LUT input value, and the third LUT output value; and
means for selecting the second LUT input value or the third LUT input value based on at least one of the noise value, adjacency of the second or third LUT input value to the first LUT input value, and non-adjacency of the second or third LUT input value to the first LUT input value.

24. A non-transitory computer-readable medium having stored thereon instructions that, when executed, cause one or more processors of a computing device to:
input a first pixel value corresponding to a first pixel of an image into a Look Up Table (LUT), wherein the LUT maps one or more LUT input values to one or more LUT output values, and wherein the first pixel value corresponds to a first LUT input value that maps to a first LUT output value in the LUT;
apply noise to the first LUT input value to generate a noise-modified first LUT input value, wherein the noise is represented by a noise value;
generate a first interpolated LUT output value for the first LUT input value based on the noise-modified first LUT input value; and
transform the image into a transformed image using the first interpolated LUT output value.

25. The non-transitory computer-readable medium of claim 24, wherein the first interpolated LUT output value is a non-mapped LUT output value.

26. The non-transitory computer-readable medium of claim 24, further comprising instructions stored thereon that, when executed, cause the one or more processors to:
select a second LUT input value, wherein the second LUT input value maps to a second LUT output value.

27. The non-transitory computer-readable medium of claim 26, further comprising instructions stored thereon that, when executed, cause the one or more processors to
generate the first interpolated LUT output value further based on at least one of the first LUT input value, the second LUT input value, and the second LUT output value.

28. The non-transitory computer-readable medium of claim 26, wherein the LUT is a first LUT among two LUTs derived from a single LUT, wherein the single LUT maps a plurality of LUT input values to one or more LUT output values, wherein the first LUT maps a subset of the plurality of input values to the one or more LUT output values of the single LUT, and wherein a second LUT derived from the single LUT maps a different subset of the plurality of input values to the one or more LUT output values of the single LUT.

29. The non-transitory computer-readable medium of claim 26, further comprising instructions stored thereon that, when executed, cause the one or more processors to:
 select a third LUT input value, wherein the third LUT input value maps to a third LUT output value.

30. The non-transitory computer-readable medium of claim 29, further comprising instructions stored thereon that, when executed, cause the one or more processors to:
 generate the first interpolated LUT output value further based on at least one of the first LUT input value, the second LUT input value, the second LUT output value, the third LUT input value, and the third LUT output value; and
 select the second LUT input value or the third LUT input value based on at least one of the noise value, adjacency of the second or third LUT input value to the first LUT input value, and non-adjacency of the second or third LUT input value to the first LUT input value.

\* \* \* \* \*